(12) United States Patent
Suda

(10) Patent No.: US 7,454,131 B2
(45) Date of Patent: Nov. 18, 2008

(54) IMAGE SENSING APPARATUS WITH CAMERA SHAKE CORRECTION FUNCTION

(75) Inventor: Hirofumi Suda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 479 days.

(21) Appl. No.: 11/320,312

(22) Filed: Dec. 27, 2005

(65) Prior Publication Data
US 2006/0140600 A1 Jun. 29, 2006

(30) Foreign Application Priority Data
Dec. 27, 2004 (JP) ............................. 2004-377240

(51) Int. Cl.
*G03B 7/093* (2006.01)
*G03B 17/00* (2006.01)

(52) U.S. Cl. .................. 396/55; 396/246; 348/208.6; 348/208.12; 348/362

(58) Field of Classification Search ............. 396/52–55; 348/208.6, 208.12, 216.1, 296, 362
See application file for complete search history.

(56) References Cited

U.S. PATENT DOCUMENTS 3,399,307 A * 8/1968 Herman ...................... 250/224
7,057,645 B1 * 6/2006 Hara et al. ................ 348/208.6
7,057,646 B2 * 6/2006 Yasuda ................... 348/208.99

FOREIGN PATENT DOCUMENTS

| JP | 5-7327 | 1/1993 |
|----|--------|--------|
| JP | 6-90402 | 3/1994 |
| JP | 6-98246 | 4/1994 |
| JP | 11-252445 | 9/1999 |

* cited by examiner

*Primary Examiner*—W. B. Perkey
(74) *Attorney, Agent, or Firm*—Morgan & Finnegan LLP

(57) ABSTRACT

In an image sensing apparatus which has a camera shake correction function of performing a camera shake correction on a plurality of images sensed by an image sensing unit by extracting a partial image from each of the sensed images on the basis of correlation between the sensed images, a camera shake amount of said image sensing apparatus is detected, and said image sensing unit is exposed for a first exposure time period when the camera shake amount is equal to or less than a predetermined amount. When the camera shake amount is greater than the predetermined amount, said image sensing unit is exposed for a second exposure time period which is shorter than the first exposure time period, image signals of a plurality of images which undergo the camera shake correction are added, and the added image signals is output as one image.

17 Claims, 18 Drawing Sheets

ONE FRAME BEFORE → CURRENT FRAME

CCD

CCD

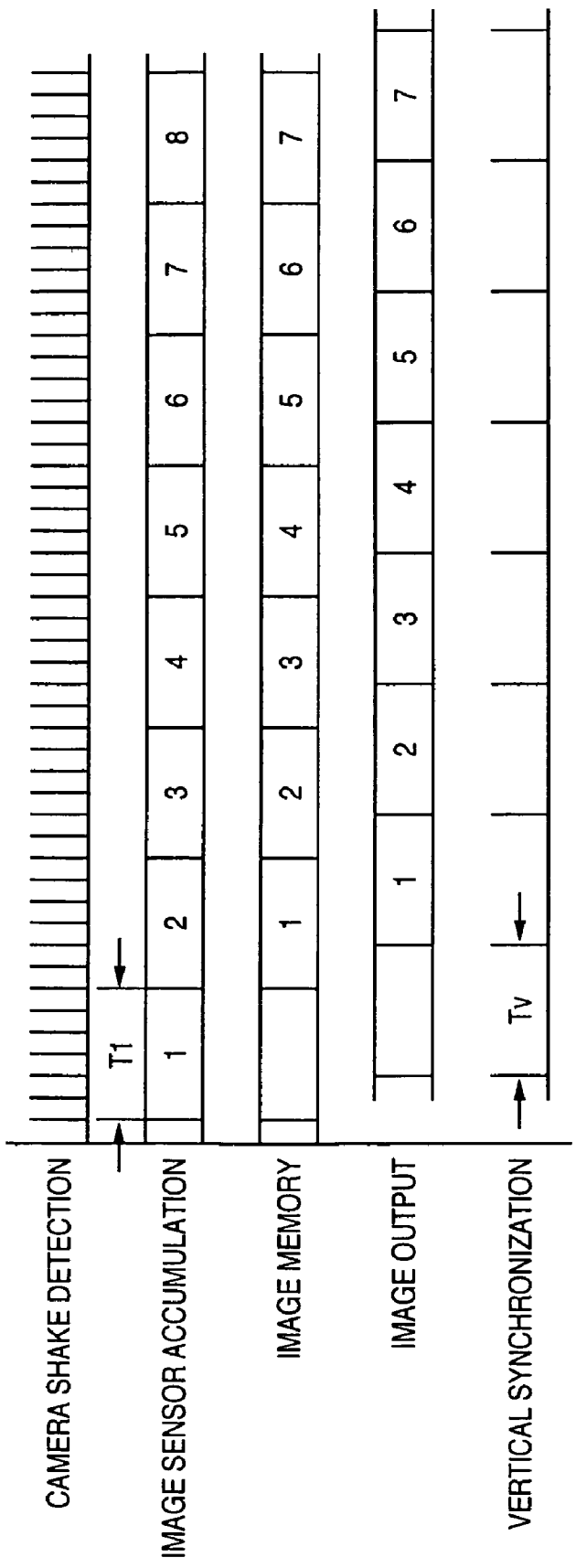

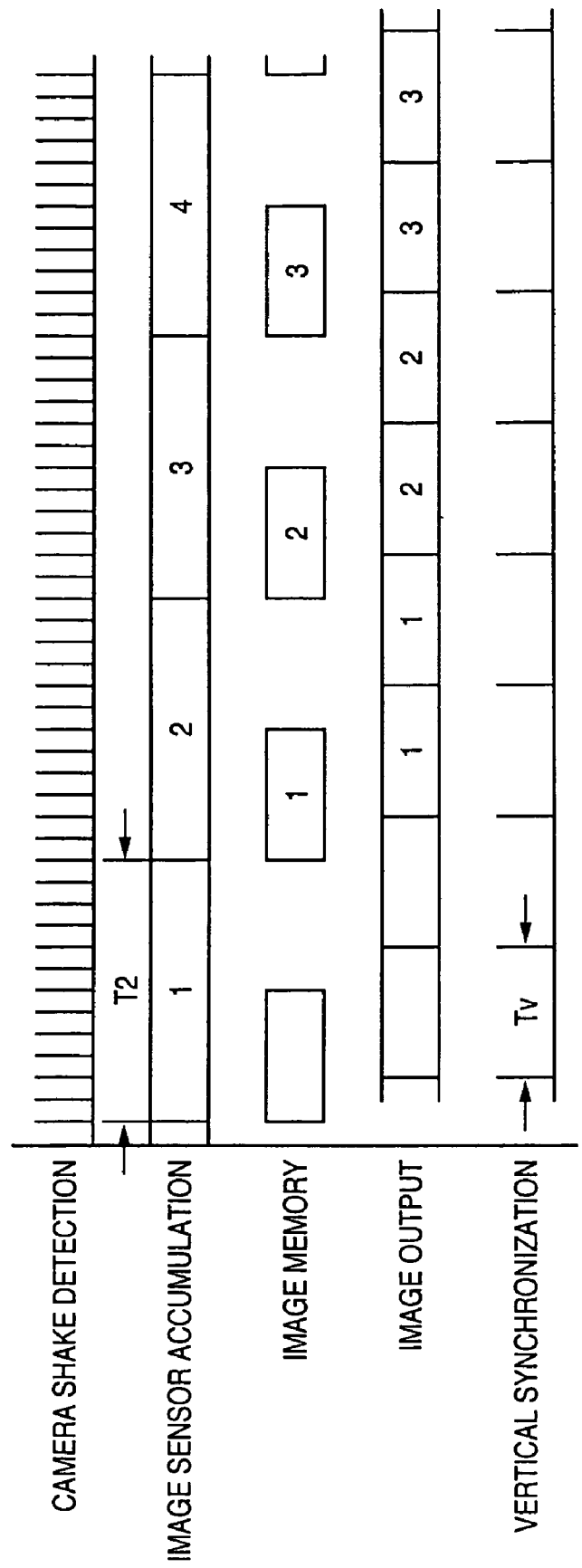

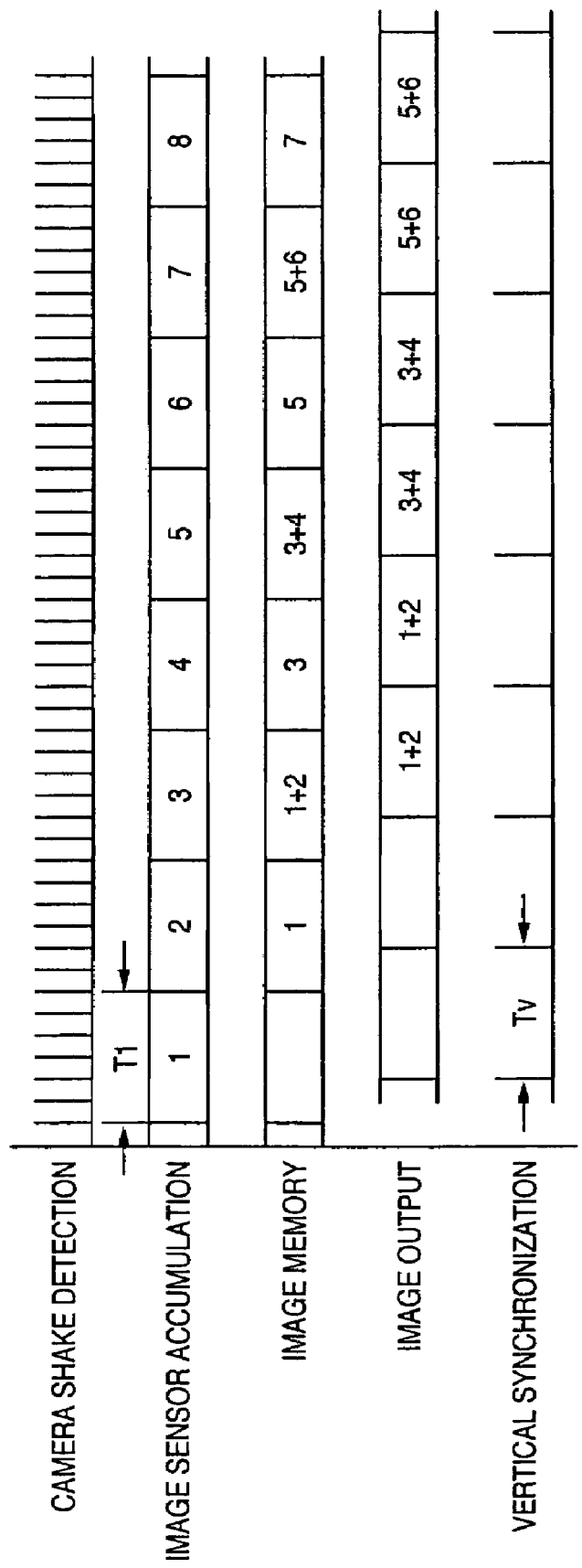

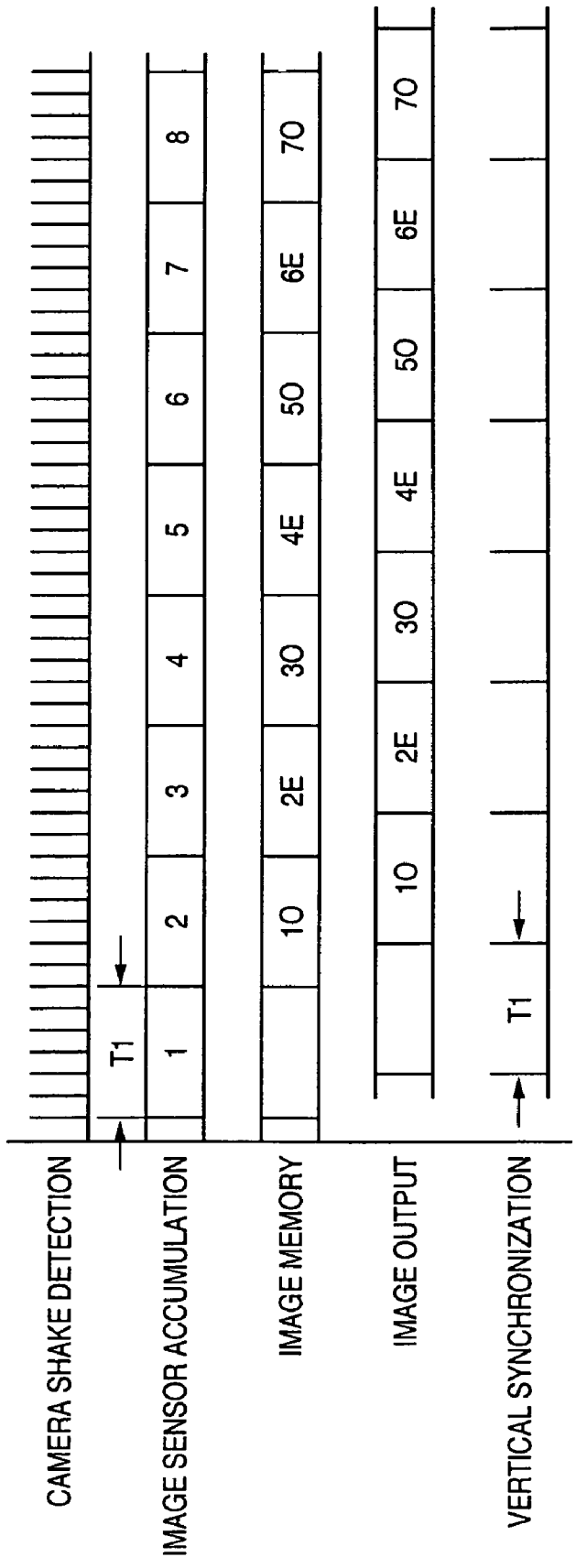

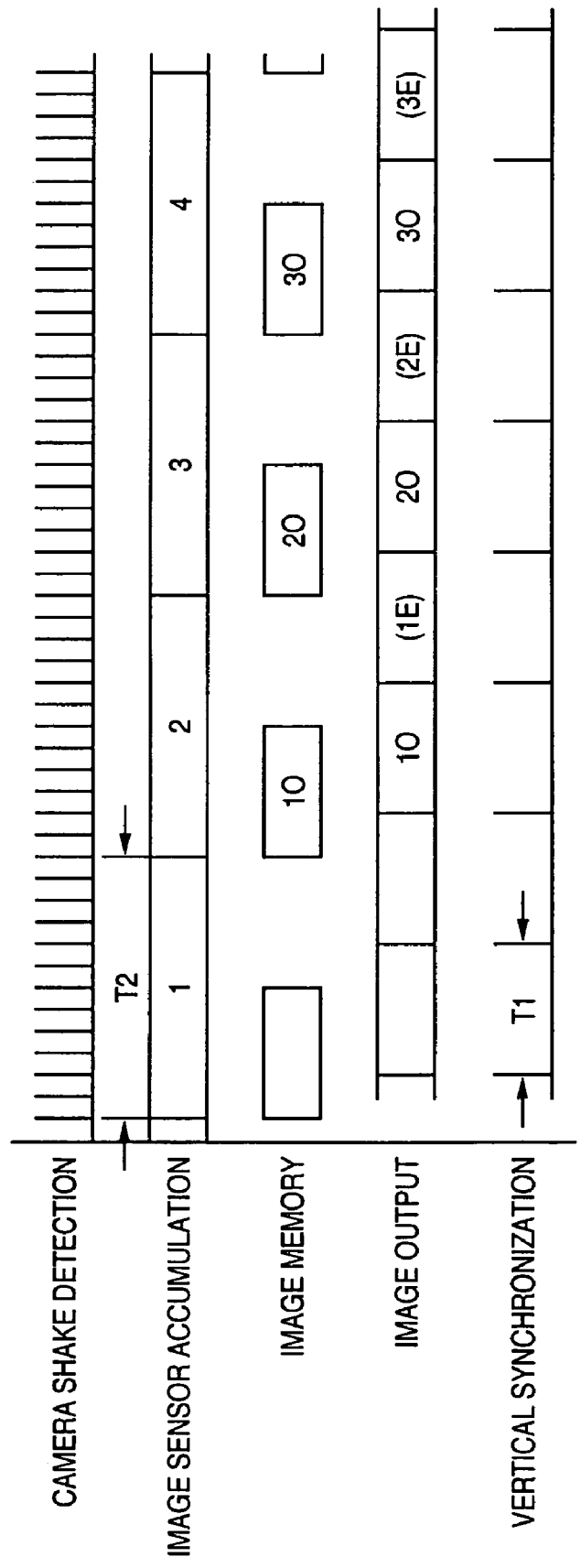

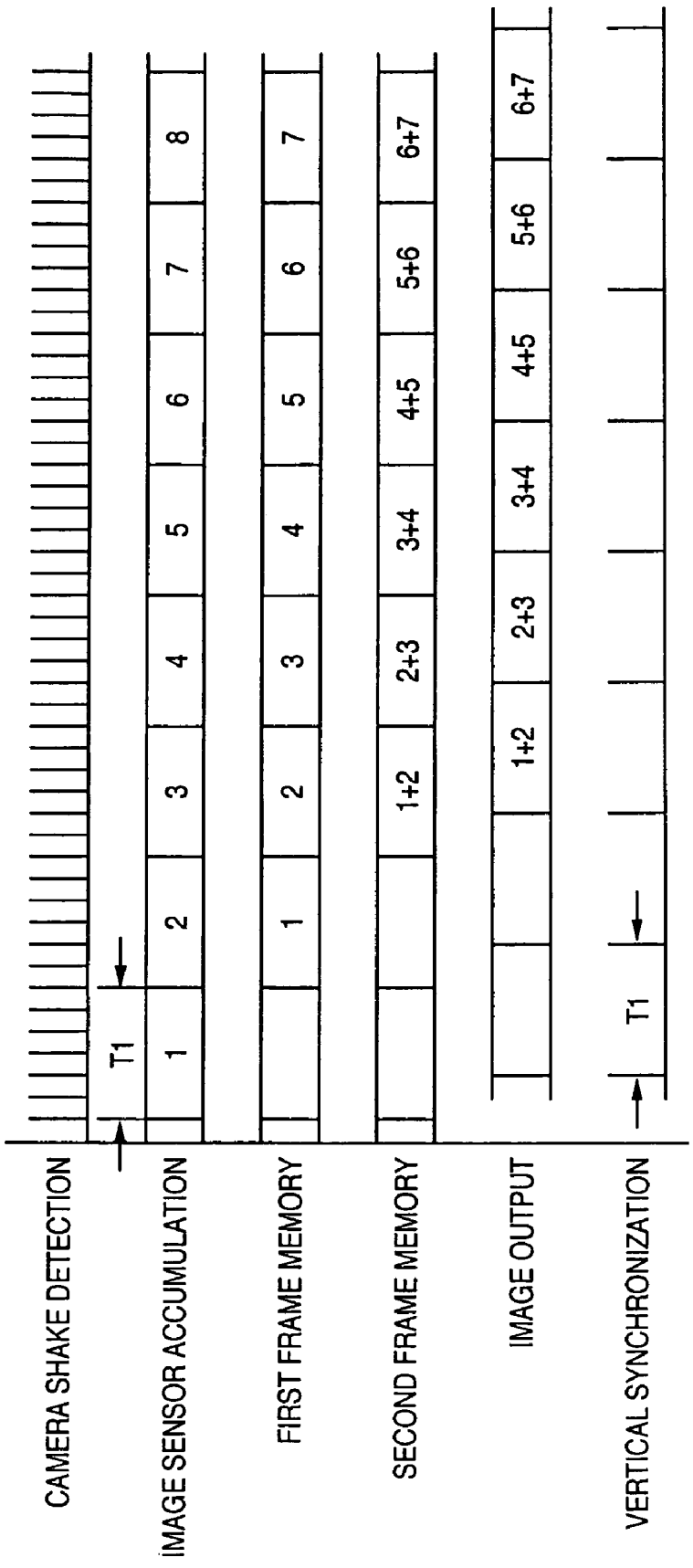

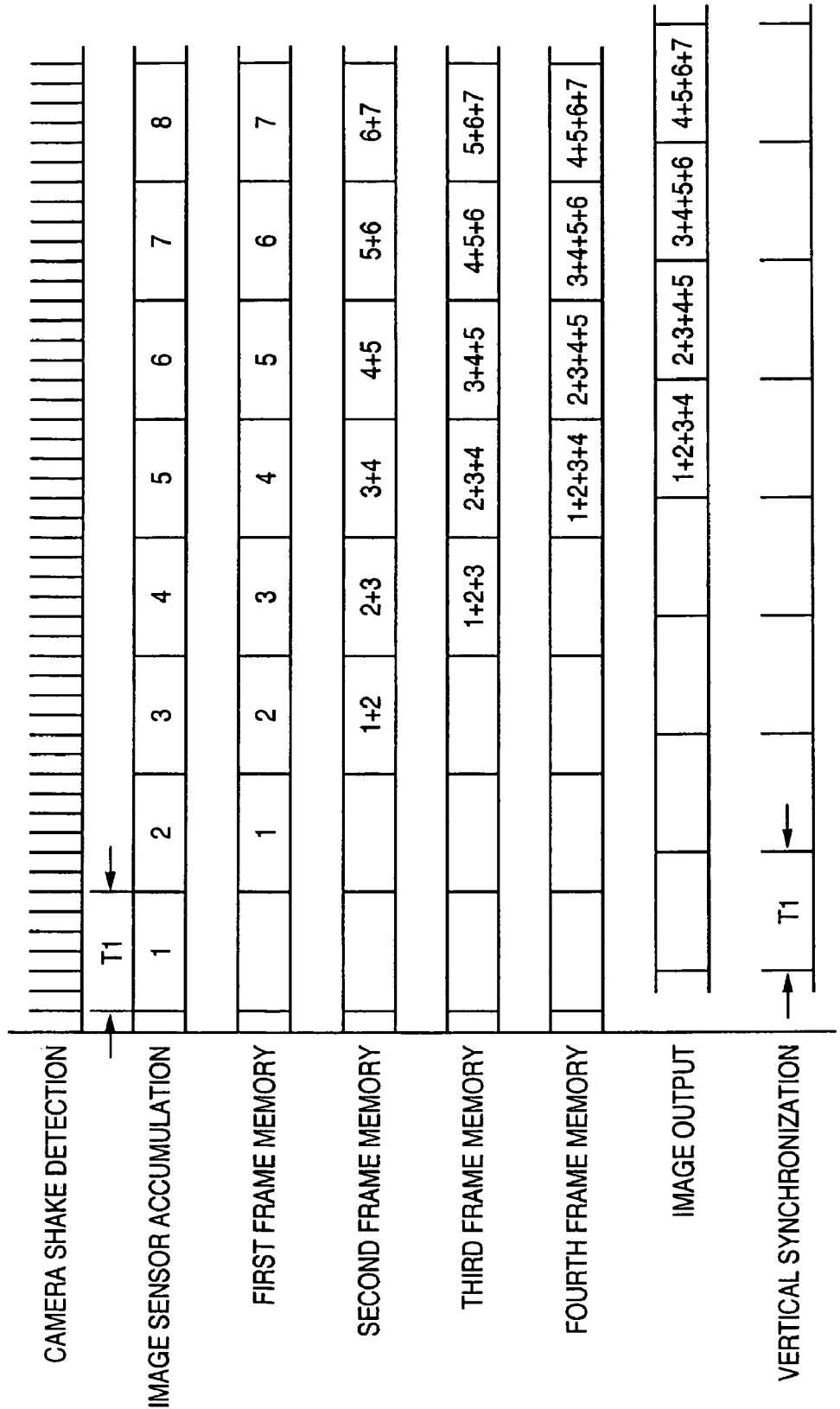

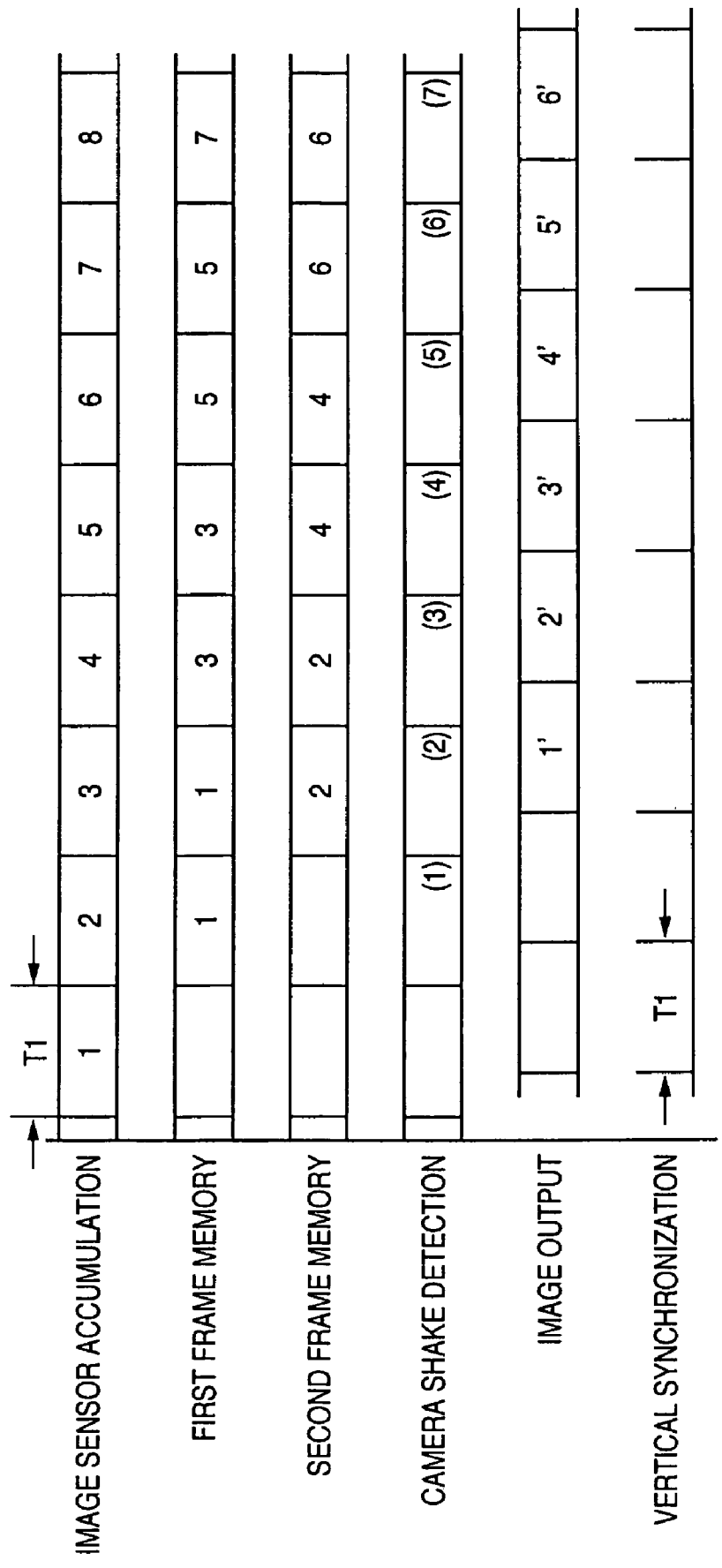

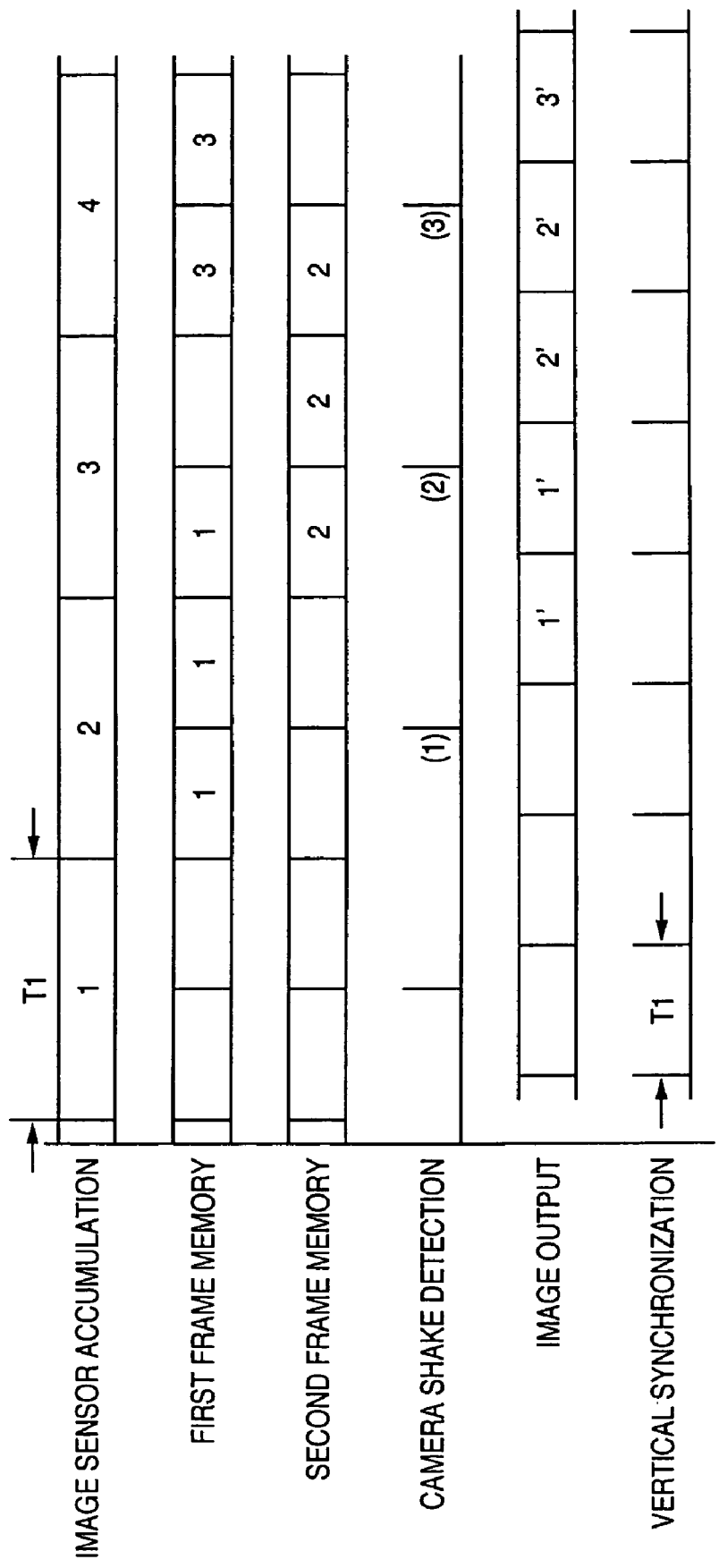

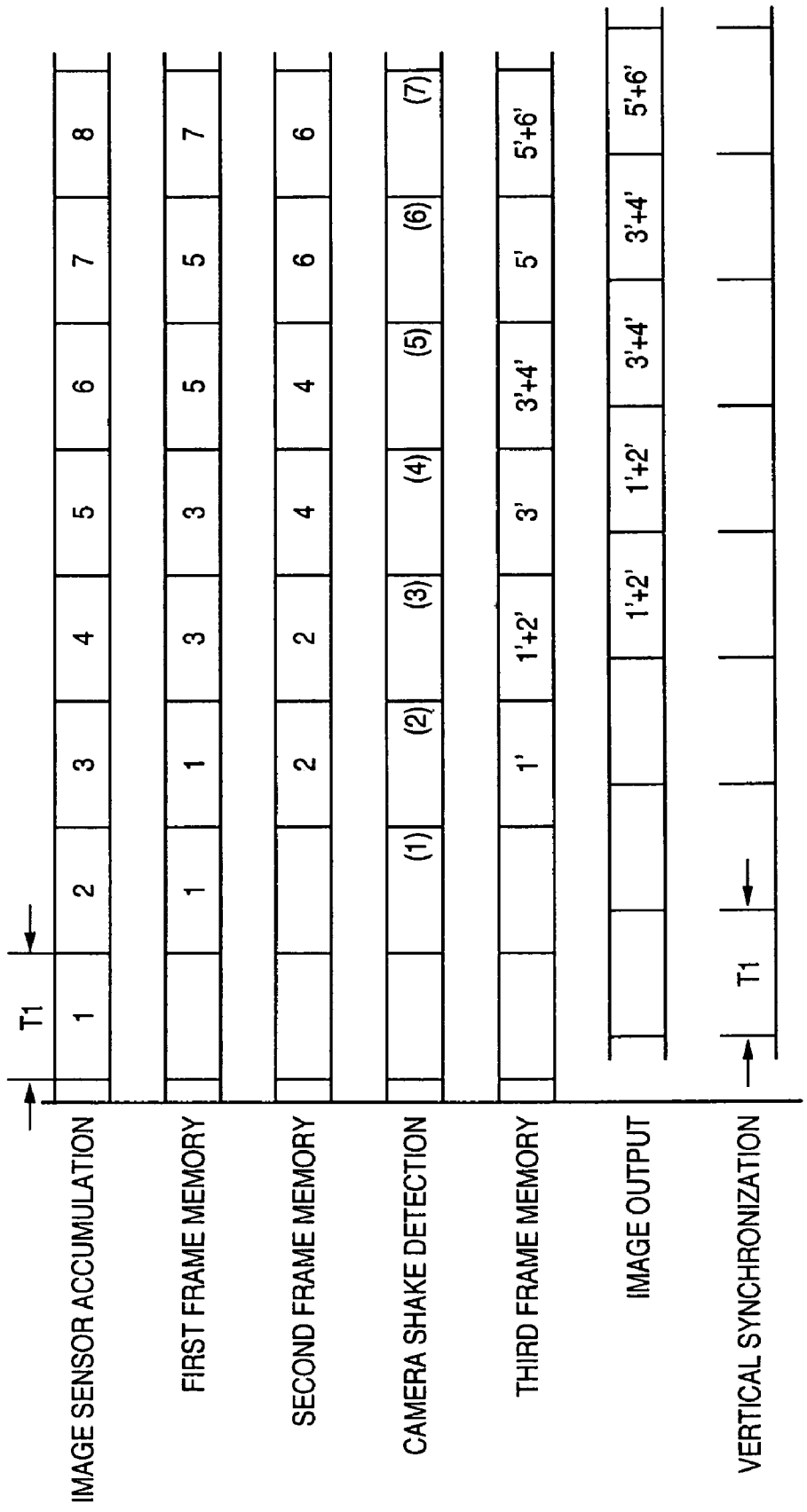
FIG. 9C PROGRESSIVE IMAGE SENSING/SLOW SHUTTER MODE 2

INTERLACED IMAGE SENSING/NORMAL MODE

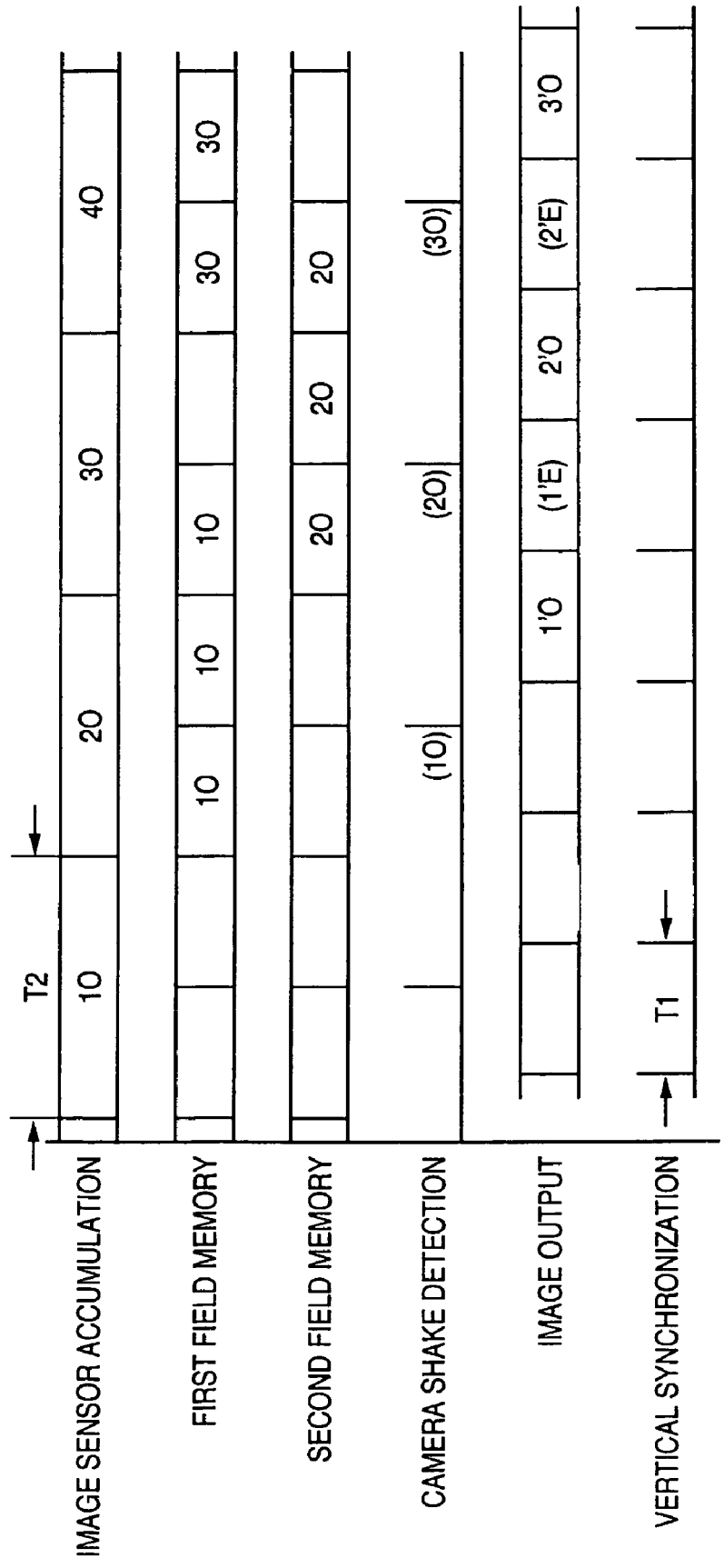

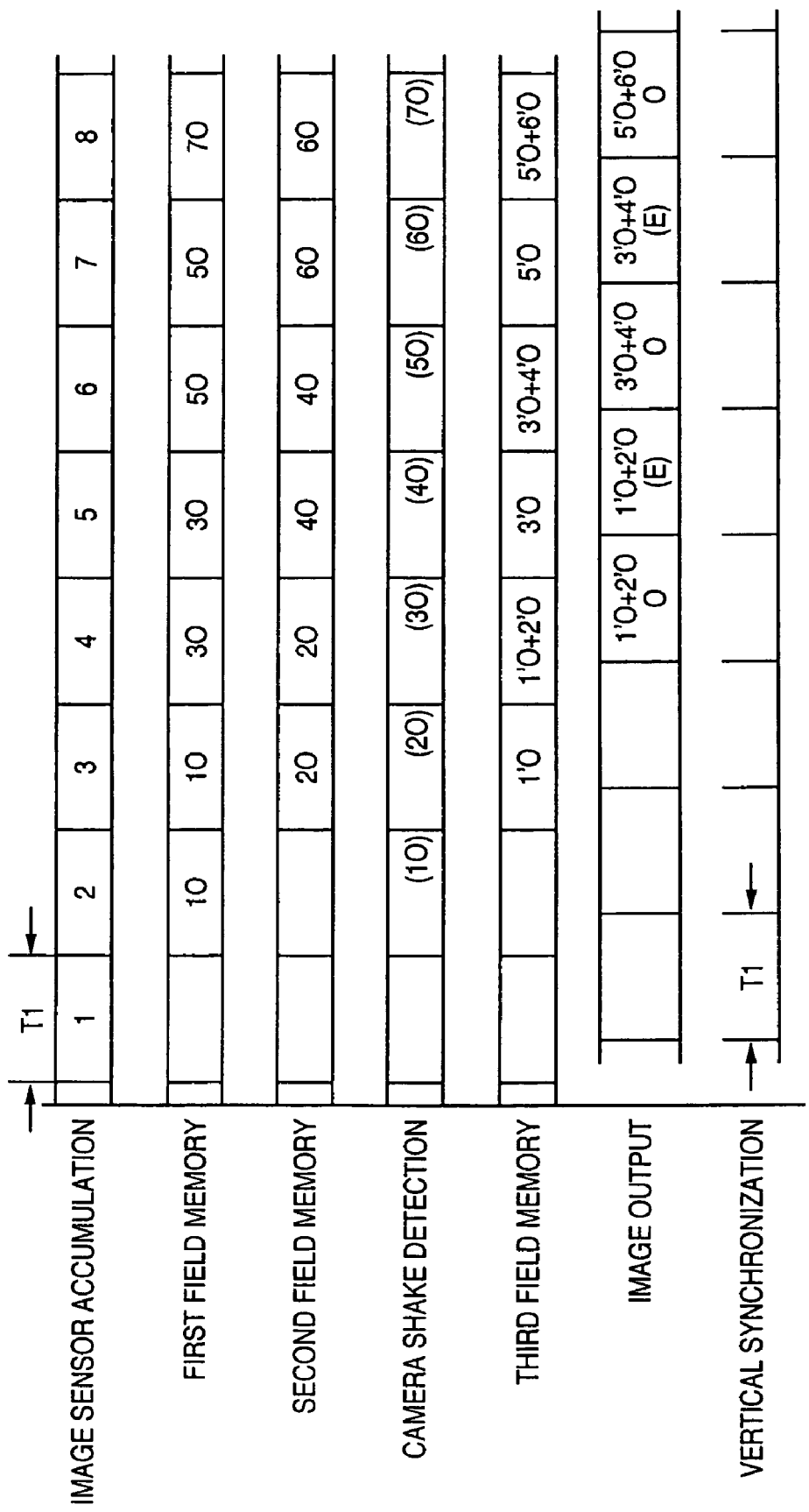

IMAGE SENSING APPARATUS WITH CAMERA SHAKE CORRECTION FUNCTION

FIELD OF THE INVENTION

The present invention relates to an image sensing apparatus such as a video camera, digital camera, or the like, which can sense a moving image, and its control method and, more particularly, to an image sensing apparatus having a function of correcting any camera shake by image processing and its control method.

BACKGROUND OF THE INVENTION

Conventionally, various techniques for correcting a camera shake have been proposed. The camera shake correction is a technique for detecting camera shake information (shake amount, shake direction, and the like) of an image sensing apparatus such as a digital video camera or the like by the photographer using an external sensor or image processing, and correcting any shake by moving a part of an optical system or extracting a part of an image to cancel the shake on the basis of the detection result.

As one scheme for detecting a camera shake amount, an external sensor detection scheme, e.g., a scheme for directly detecting a camera shake of the image sensing apparatus using an angular velocity sensor represented by a vibration gyro is known (see, for example, Japanese Patent Laid-Open No. 06-98246). Also, as another scheme for detecting a camera shake amount, a scheme based on image processing, e.g., a scheme for detecting a camera shake by detecting a motion vector of a screen from a plurality of sensed images is also known (see, for example, Japanese Patent Laid-Open No. 05-7327).

Furthermore, as a scheme for correcting a camera shake, optical camera shake correction schemes such as a method of correcting a camera shake by moving an image formed on an image sensor by moving a part of an image sensing lens system in a direction perpendicular to the optical axis, a method of correcting a camera shake by moving an image formed on an image sensor by placing a variable apical angle prism in front of an image sensing lens system and varying the apex angle of the variable apex angle prism, and the like are known (see, for example, Japanese Patent Laid-Open No. 06-98246). A characteristic feature of this optical camera shake correction scheme lies in that a broad correction dynamic range can be assured. However, this scheme requires mechanical components such as an actuator, optical element, and the like, and is disadvantageous in terms of cost.

On the other hand, camera shake correction based on a digital image extraction method which corrects a camera shake by preparing an image sensor relatively larger than an actually required image size, and extracting a part of an image so as to correct a camera shake from an image obtained from the image sensor in accordance with the camera shake amount is effective for moving image sensing or the like, and has an advantage in terms of cost since it does not require any mechanical components. Hence, this scheme has prevailed widely (see, for example, Japanese Patent Laid-Open No. 05-7327).

Actually, a video camera often senses an image without using any video light or flash even in dim night image sensing or the like. This is because in moving image sensing, the flash which can only instantly illuminate brightly is of no use. Also, the video light is not convenient to use since it requires much electric power and image sensing equipment becomes bulky and heavy. Therefore, in order to allow image sensing of a low-luminance object or low-illuminance object, a slow shutter mode that senses an image by prolonging the exposure time more than one frame time (the time for one frame or field) of a normal moving image is known (see, for example, Japanese Patent Laid-Open No. 06-90402).

However, since the aforementioned slow shutter mode assures a long exposure time by reducing the number of frames of a moving image, not only the motion of a moving image becomes unnatural, but also the camera shake correction based on the digital image extraction method cannot obtain a sufficient camera shake correction effect since a camera shake is more likely to occur during image sensing of one frame of a moving image. This is because the aforementioned digital image extraction scheme is a function of obtaining a moving image free from any camera shake since it corrects the motion between neighboring frames of a moving image by changing an image extraction range, and it cannot correct any camera shake that has occurred in one frame of a moving image.

In order to solve this drawback, a proposal which senses a plurality of images using a high-speed electronic shutter, obtains a camera shake correction effect by superposing images while correcting a camera shake by detecting a camera shake amount by vector detection, and obtains a sufficient image signal value has been made (see, for example, Japanese Patent Laid-Open No. 11-252445).

In the aforementioned conventional slow shutter mode, since charges are accumulated on an image sensor for a long period of time by long-time exposure, a high quality image with less noise can be obtained. By contrast, in the method of superposing a plurality of images for realizing the camera shake correction, noise in the image increases in proportion to the number of superimposed images, which causes degradation of the obtained image.

SUMMARY OF THE INVENTION

The present invention has been made in consideration of the above situation, and has as its object to sense a moving image having a smooth motion with low cost while correcting a camera shake by a digital image extraction method upon sensing a low-luminance/low-illuminance object.

According to the present invention, the foregoing object is attained by providing an image sensing apparatus which has a camera shake correction function of performing a camera shake correction on a plurality of images sensed by an image sensing unit by extracting a partial image from each of the sensed images on the basis of correlation between the sensed images, comprising:

a camera shake amount detection unit that detects a camera shake amount of the image sensing apparatus, an exposure control unit that controls to expose the image sensing unit for a first exposure time period when the camera shake amount is equal to or less than a predetermined amount, and for a second exposure time period which is shorter than the first exposure time period when the camera shake amount is greater than the predetermined amount; and an addition unit that, when the camera shake amount is greater than the predetermined amount, adds image signals of a plurality of images which undergo the camera shake correction, and outputs the added image signals as one image.

According to the present invention, the foregoing object is attained by providing a method of controlling an image sensing apparatus which has a camera shake correction function of performing a camera shake correction on a plurality of images sensed by an image sensing unit by extracting a partial image from each of the sensed images on the basis of correlation between the sensed images, comprising:

detecting a camera shake amount of the image sensing apparatus;

controlling to expose the image sensing unit for a first exposure time period when the camera shake amount is equal to or less than a predetermined amount, and for a second exposure time period which is shorter than the first exposure time period when the camera shake amount is greater than the predetermined amount; and when the camera shake amount is greater than the predetermined amount, adding image signals of a plurality of images which undergo the camera shake correction, and outputs the added image signals as one image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4C are charts for explaining the read and image processing timings of image signals according to the first embodiment of the present invention;

FIGS. 5A to 5C are charts for explaining the read and image processing timings of image signals according to the second embodiment of the present invention;

FIG. 6 is a chart for explaining the read and image processing timings of image signals according to the third embodiment of the present invention;

FIG. 7 is a chart for explaining the read and image processing timings of image signals according to a modification of the third embodiment of the present invention;

FIGS. 9A to 9C are charts for explaining the read and image processing timings of image signals according to the fourth embodiment of the present invention; and FIGS. 10A to 10C are charts for explaining the read and image processing timings of image signals according to the fifth embodiment of the present invention.

DETAILED DESCRIPTION OF THE PREFERRED EMBODIMENTS

Preferred embodiments of the present invention will now be described in detail in accordance with the accompanying drawings.

Figure 1:
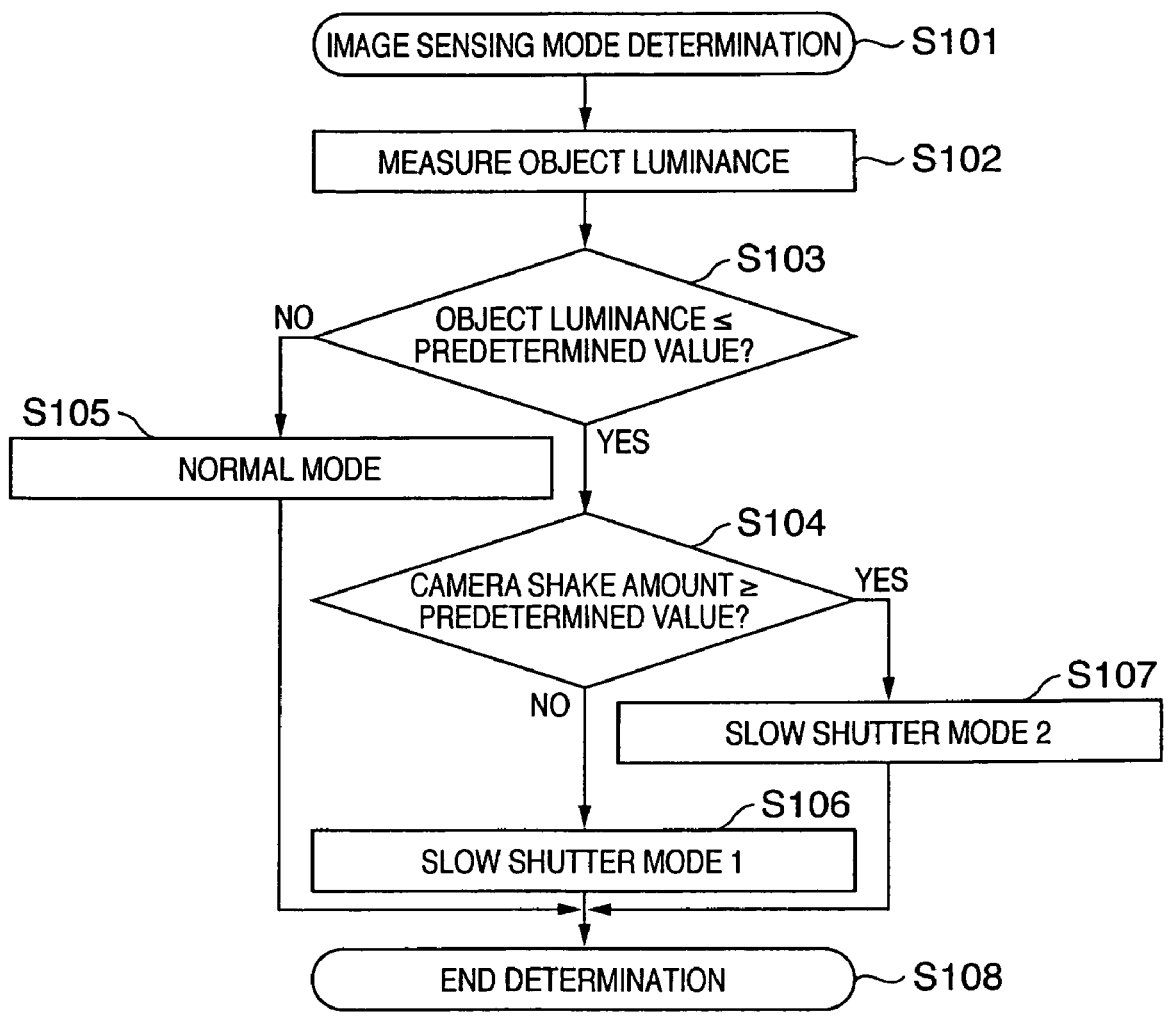
FIG. 1 is a flowchart showing determination processing of an image sensing mode according to an embodiment of the present invention.

FIG. 1 is a flowchart showing an image sensing mode determination algorithm common to respective embodiments of the present invention.

In step S101, the image sensing mode determination algorithm starts. In step S102, the luminance of an object to be sensed is measured based on, e.g., object information or the like obtained from an image sensor. It is checked in step S103 if the object luminance is equal to or lower than a predetermined value. If it is determined that the object luminance is higher than the predetermined value, the flow advances to step S105 to set a normal image sensing mode (to be referred to as a "normal mode" hereinafter) as an image sensing mode. On the other hand, if it is determined that the object luminance is equal to or lower than the predetermined value, the flow advances to step S104. It is checked in step S104 if a camera shake amount is equal to or larger than a predetermined value. If the camera shake amount is smaller than the predetermined value, the flow advances to step S106 to set an image sensor charge accumulated slow shutter mode to be described later (to be referred to as "slow shutter mode 1" hereinafter) as the image sensing mode. On the other hand, if it is determined that the camera shake amount is equal to or larger than the predetermined value, the flow advances to step S107 to set a memory charge accumulated slow shutter mode to be described later (to be referred to as "slow shutter mode 2" hereinafter) as the image sensing mode. After the image sensing mode is set in step S105, S106, or S107, the image sensing mode determination algorithm ends in step S108.

That is, with the above determination algorithm, when the object is sufficiently bright, the normal mode is set; when the object is dark and the shake of the image sensing apparatus is small, slow shutter mode 1 is set; or when the object is dark and the shake of the image sensing apparatus is large, slow shutter mode 2 is set. Since the read and processing timings of an image signal from an image sensor in the respective modes are different depending on the types of the image sensor and processors, control methods, and the like, some examples will be practically explained hereinafter.

First Embodiment

The first embodiment of the present invention will be described first.

Figure 2:
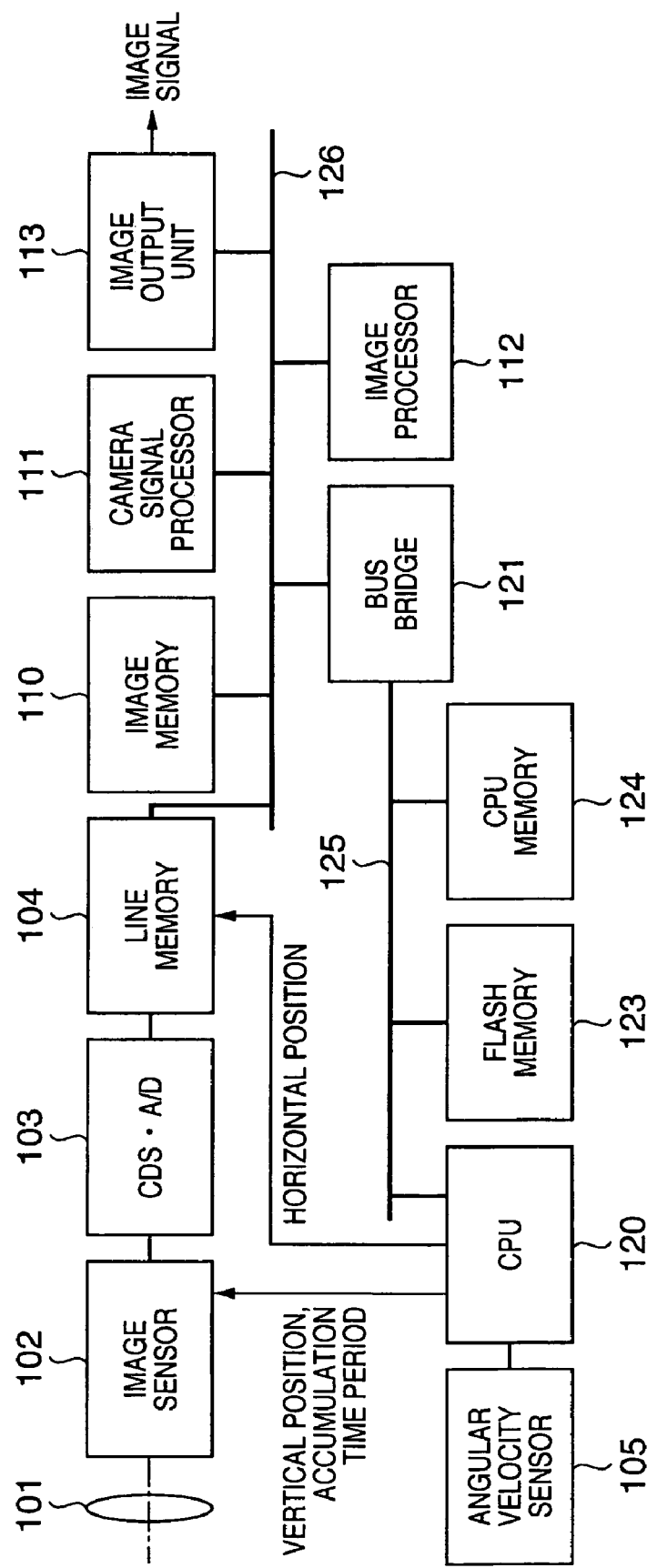
FIG. 2 is a block diagram showing the arrangement of an image sensing apparatus according to the first to third embodiments of the present invention.

FIG. 2 is a block diagram showing the arrangement of a digital video camera (to be simply referred to as a "camera" hereinafter) as the image sensing apparatus according to the first embodiment of the present invention. From the startup timing of the camera, a CPU 120 operates according to programs in a flash memory 123 to control various operations to be described later.

Light coming from an object forms an image on an image sensor 102 via a lens group 101. An object image formed on the image sensor 102 is sampled/held and is then converted from an analog signal into a digital signal by a CDS·A/D circuit 103. A line memory 104 temporarily stores a digital signal for one line output from the CDS·A/D circuit 103, and supplies a digital signal in a predetermined range (to be described later) of the stored digital signal onto an image bus 126. Note that an image memory 110, camera signal processor 111, image processor 112, and video output unit 113 which will be described later are connected to the image bus 126 and exchange image data via the image bus 126.

The image memory 110 temporarily stores image data for one frame output from the line memory 104. The camera signal processor 111 processes the image data stored in the image memory 110 to be standard image data. The image processor 112 performs enlargement/reduction of images, addition of images, frame conversion processing, and the like.

The video output unit 113 converts digital image data into a standard TV signal such as NTSC, PAL, or the like, which is used in general.

The CPU 120, the flash memory 123, and a CPU memory 124 are connected to a CPU bus 125 via a bus bridge 121. The CPU 120 controls the overall camera. The flash memory 123 stores programs and various parameter values required to operate the CPU 120. The CPU memory 124 is used as a work memory upon operating the CPU 120.

An angular velocity sensor 105 is connected to the CPU 120. The angular velocity detected by the angular velocity sensor 105 is converted into camera shake information when it is processed by the CPU 120, and the camera shake information is used to control the image sensor 102 and line memory 104, thus attaining a camera shake correction operation. This angular velocity sensor 105 detects two axes perpendicular to the optical axis of the lens group 101 to detect a camera shake hazardous to image sensing.

Figure 3A:
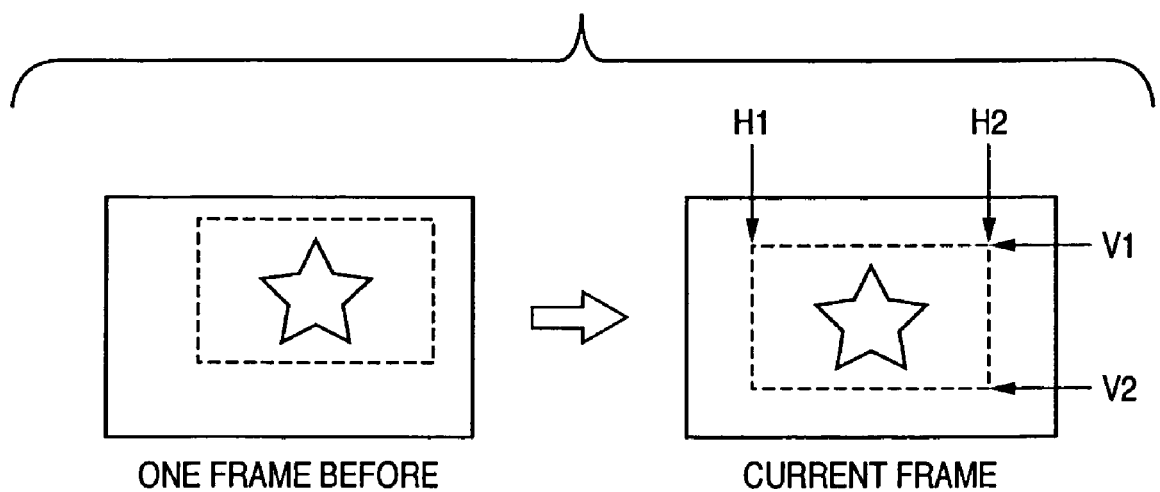
FIGS. 3A to 3C are views for explaining the concept of camera shake correction processing according to the embodiment of the present invention.
Figure 3B:
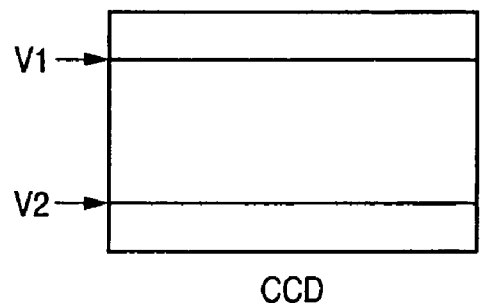
Figure 3C:
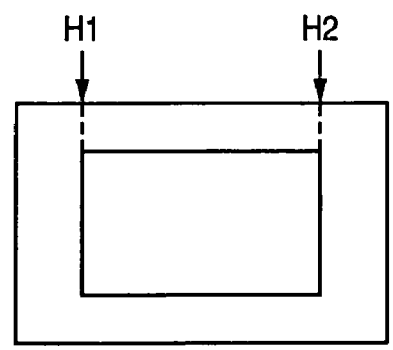

FIGS. 3A to 3C are conceptual views for explaining the camera shake correction operation according to the first embodiment of the present invention. The CPU 120 controls the read timings of image signals from the image sensor 102 on the basis of the vertical camera shake information obtained from the output of the angular velocity sensor 105, so that an object in an image extracted from the immediately preceding frame of the outputs from the image sensor 102 is located at substantially the same position in an image extracted from the current frame, as shown in FIG. 3A.

For the vertical direction, the CPU 120 controls to output only image signal components between vertical positions V1 and V2 to the CDS·A/D circuit 103, as shown in FIG. 3B. That is, the CPU 120 determines the read start/end positions of V1 and V2 for each read timing of one image from the image sensor 102 so as to correct a vertical camera shake. A digital image signal for one line output from the CDS·A/D circuit 103 is temporarily stored in the line memory 104.

Next, the CPU 120 controls to output only image signal components between horizontal positions H1 and H2 of the image signal stored in the line memory 104 onto the image bus 126, as shown in FIG. 3C, on the basis of horizontal camera shake information obtained from the output of the angular velocity sensor 105. That is, the CPU 120 determines the read start/end positions of H1 and H2 for each read timing of one image from the image sensor 102 so as to correct a horizontal camera shake.

The flows and timings of signals in the normal mode, slow shutter mode 1, and slow shutter mode 2 described using FIG. 1 when camera shake detection is made using the angular velocity sensor 105 as an external detection sensor and progressive moving image sensing is performed will be described below with reference to FIGS. 4A to 4C.

FIG. 4A shows the read and image processing timings of an image signal in the normal mode, FIG. 4B shows the read and image processing timings of image signals in slow shutter mode 1, and FIG. 4C shows the read and image processing timings of image signals in slow shutter mode 2.

(1) Normal Mode

The operation in the normal mode shown in FIG. 4A will be explained first. The image sensor 102 photoelectrically converts light coming from an object and accumulates charges during an accumulation time period T1. During this accumulation time period T1, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image, thus attaining camera shake correction. An image signal for one frame, which is extracted in this way, is stored in the image memory 110.

The image signal stored in the image memory 110 is converted into a standard video signal at a vertical synchronization timing via the camera signal processor 111, image processor 112, and video output unit 113, and is output to and displayed on an image output device such as a display or the like (not shown). Note that a vertical synchronization period Tv at that time is equal to the accumulation time period T1 of the image sensor 102. By repeating processes from the read process until the display output process, a moving image is sensed.

(2) Slow Shutter Mode 1

The operation in slow shutter mode 1 shown in FIG. 4B will be described below. Slow shutter mode 1 is set when the object is dark, and a camera shake is small.

In slow shutter mode 1, the image sensor 102 is exposed during an accumulation time period T2 twice an accumulation time period in the normal mode. During the accumulation time period T2, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image, thus attaining camera shake correction. An image signal for one frame, which is extracted in this way, is stored in the image memory 110.

The image signal stored in the image memory 110 is converted into a standard video signal at a vertical synchronization timing via the camera signal processor 111, image processor 112, and video output unit 113, and is output to and displayed on an image output device such as a display or the like (not shown). However, in this case, as can be seen from FIG. 4B, since the accumulation time period of the image sensor 102 in slow shutter mode 1 is twice an accumulation time period in the normal mode, an image is stored in the image memory 110 at every other time interval corresponding to the accumulation time period T1. Since the vertical synchronization period Tv is ½ the accumulation time period T2, an identical image is repetitively output twice, and an image update cycle appears once per two vertical synchronization periods Tv. Furthermore, since a camera shake correction cycle also appears once per two vertical synchronization periods Tv, the camera shake correction characteristics are inferior to those in the normal mode. However, upon sensing a dark image, since the accumulation time period is set to be twice an accumulation time period in the normal mode, the charge amount accumulated on the image sensor 102 can be increased, thus acquiring a brighter image which suffers less noise.

(3) Slow Shutter Mode 2

Finally, the operation in slow shutter mode 2 shown in FIG. 4C will be described below. Slow shutter mode 2 is set when the object is dark, and a camera shake is large.

In slow shutter mode 2, the image sensor 102 is exposed during the same accumulation time period T1 as in the normal mode. During this accumulation time period T1, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image, thus attaining camera shake correction. An image signal for one frame, which is extracted in this way, is stored in the image memory 110.

After that, the image sensor 102 is similarly exposed during the accumulation time period T1 to acquire a camera shake-corrected image signal for one frame. The image processor 112 adds this image signal to that stored in the image memory 110, and stores the sum image signal in the image memory 110 again.

The image signal stored in the image memory 110 is converted into a standard video signal at a vertical synchronization timing via the camera signal processor 111, image processor 112, and video output unit 113, and is output to and displayed on an image output device such as a display or the like (not shown). In this case, the vertical synchronization period Tv is equal to the accumulation time period T1 of each frame. However, since the sum image signal is stored in the image memory 110 once per two accumulation time periods T1, an identical image is repetitively output twice, and the image update cycle appears once per two vertical synchronization periods Tv. However, upon sensing the dark image, a brighter image can be obtained.

In this manner, in slow shutter mode 2, image signals for two frames, each of which is read out during the accumulation time period T1, are added to generate a sensed image signal in place of single long-time accumulation on the image sensor 102 unlike in slow shutter mode 1. Although the noise amount increases compared to slow shutter mode 1, since camera shake correction is made for each frame, its characteristics become equivalent to those in the normal mode. Even when a camera shake is large, an image with a high camera shake correction effect can be acquired.

As described above, according to the first embodiment, by changing the image read timing and camera shake correction method in accordance with the brightness of the object and the degree of shake of the image sensing apparatus, an image with higher image quality can be acquired.

Second Embodiment

The second embodiment of the present invention will be described below.

In the second embodiment, the flows and timings of signals in the normal mode, slow shutter mode 1, and slow shutter mode 2 described using FIG. 1 when camera shake detection is made using the angular velocity sensor 105 as an external detection sensor and interlaced moving image sensing is performed will be described below with reference to FIGS. 5A to 5C. Note that the second embodiment performs the camera shake correction operation described with reference to FIGS. 3A to 3C using the digital video camera shown in FIG. 2 described in the first embodiment, and a description thereof will be omitted.

(1) Normal Mode

The operation in the normal mode shown in FIG. 5A will be explained first. The image sensor 102 photoelectrically converts light coming from an object and accumulates charges during an accumulation time period T1. During this accumulation time period T1, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image every other line, thus attaining camera shake correction of each field image. An image signal for one field (e.g., "1O" in FIG. 5A), which is extracted in this way, is stored in the image memory 110. After that, by reading out signal components of lines different from those from which image signal components accumulated in the immediately preceding accumulation time period T1 are read out, image signals for one field (e.g., "2E", "3O", "4E", etc. in FIG. 5A) are stored in the image memory 110. Note that "O" indicates an odd field, and "E" indicates an even field.

The image signal for one field stored in the image memory 110 is converted into a standard video signal via the camera signal processor 111, image processor 112, and video output unit 113, and image signals for odd and even fields are alternately output to and displayed on an image output device such as a display or the like (not shown) at vertical synchronization timings. Note that a vertical synchronization period Tv at that time is equal to the accumulation time period T1 of the image sensor 102.

(2) Slow Shutter Mode 1

The operation in slow shutter mode 1 shown in FIG. 5B will be described below.

In slow shutter mode 1, the image sensor 102 is exposed during an accumulation time period T2 twice an accumulation time period in the normal mode. During this accumulation time period T2, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image every other line, thus attaining camera shake correction of each field image. An image signal for one field (e.g., "1O" in FIG. 5B), which is extracted in this way, is stored in the image memory 110. After that, images are similarly extracted at intervals of the accumulation time period T2, and image signals for one field are stored in the image memory 110. Note that the example of FIG. 5B shows a case wherein only odd fields are read out. However, only even fields may be read out.

The image signal for one field stored in the image memory 110 is converted into a standard video signal of one field via the camera signal processor 111, image processor 112, and video output unit 113, an image signal of the other field (even field in the example of FIG. 5B) is generated from this one field (odd field in the example of FIG. 5B), and image signals for odd and even fields are alternately output to and displayed on an image output device such as a display or the like (not shown) at vertical synchronization timings. Note that a vertical synchronization period Tv at that time is ½ the accumulation time period T2. However, since the other field (even field in the example of FIG. 5B) is generated from the one field (odd field in the example of FIG. 5B), an image update cycle becomes equal to the vertical synchronization period Tv.

Since a camera shake correction cycle appears once per two vertical synchronization periods Tv, the camera shake correction characteristics are inferior to those in the normal mode. However, upon sensing a dark image, since the accumulation time period is set to be twice that in the normal mode, the charge amount accumulated on the image sensor 102 can be increased, thus acquiring a brighter image which suffers less noise.

(3) Slow Shutter Mode 2

Finally, the operation in slow shutter mode 2 shown in FIG. 5C will be described below.

In slow shutter mode 2, the image sensor 102 is exposed during the same accumulation time period T1 as in the normal mode. During this accumulation time period T1, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image every other line, thus attaining camera shake correction of each field image. An image signal for one field (e.g., "1O" in FIG. 5C), which is extracted in this way, is stored in the image memory 110.

Figure 5C:
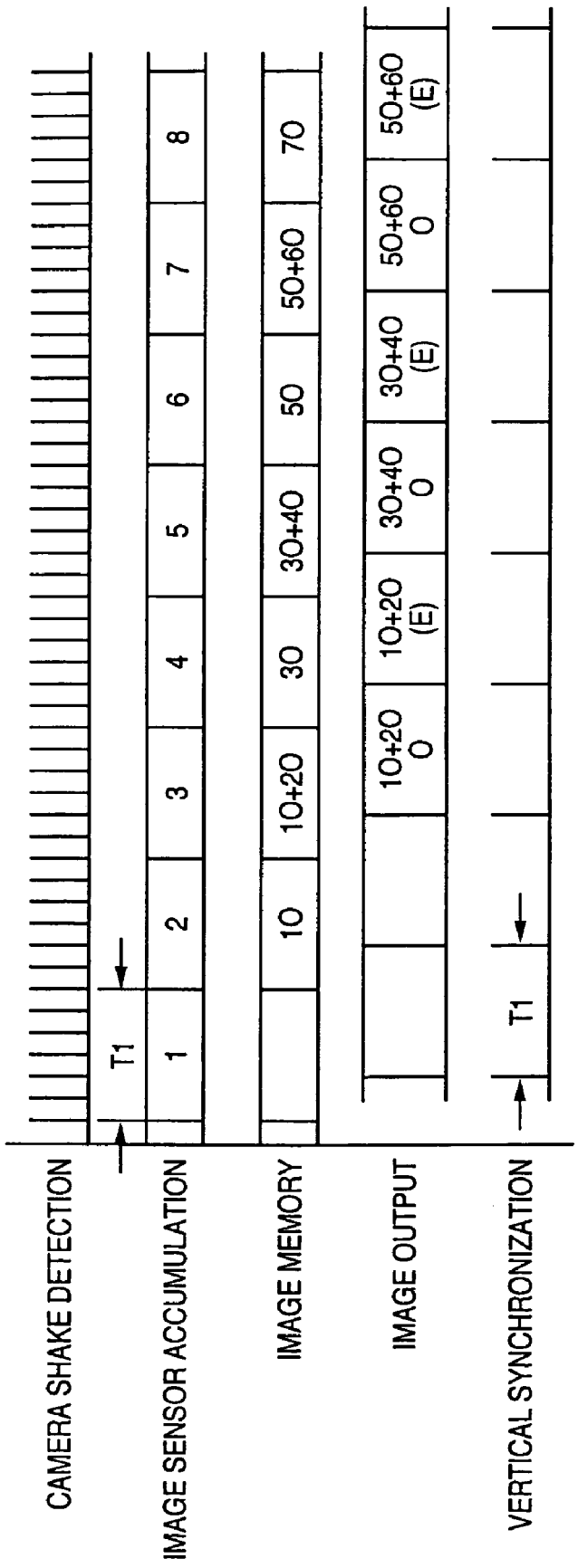

After that, the image sensor 102 is similarly exposed during the accumulation time period T1 to acquire a camera shake-corrected image signal for one field (e.g., "2O" in FIG. 5C). The image processor 112 adds this image signal to that stored in the image memory 110, and stores the sum image signal (e.g., "1O+2O" in FIG. 5C) in the image memory 110 again.

Likewise, the operation for extracting an image for each accumulation time period T1 and storing an image signal for one field in the image memory 110, and the operation for adding the readout image signal to an image signal already stored in the image memory 110, and storing the sum signal in the image memory 110 again are alternately repeated.

Note that the example of FIG. 5C shows a case wherein only odd fields are read out. However, only even fields may be read out.

The image signal for one field stored in the image memory 110 in this way is converted into a standard video signal of one field via the camera signal processor 111, image processor 112, and video output unit 113, an image signal (e.g., "1O+2O, E")of the other field (even field in the example of FIG. 5C) is generated from this image signal (e.g., "1O+2O, O") of one field (odd field in the example of FIG. 5C), and they are output to and displayed on an image output device such as a display or the like (not shown) at vertical synchronization timings. In this case, although the vertical synchronization period Tv is the same as the accumulation time period T1, the sum image signal is stored in the image memory 110 once per two vertical synchronization periods Tv. However, since the other field (e.g., even field) is generated from the one field (e.g., odd field), an image update cycle becomes equal to the vertical synchronization period Tv.

In this manner, in slow shutter mode 2, image signals for two fields, each of which is read out during the accumulation time period T1, are added to generate a sensed image signal in place of single long-time accumulation on the image sensor 102 unlike in slow shutter mode 1. Although the noise amount increases compared to slow shutter mode 1, since camera shake correction is made for each field, its characteristics become equivalent to those in the normal mode. Even when a camera shake is large, an image with a high camera shake correction effect can be acquired.

Third Embodiment

The third embodiment of the present invention will be described below.

In the third embodiment, another operation of slow shutter mode 2 described using FIG. 1 when camera shake detection is made using the angular velocity sensor 105 as an external detection sensor and progressive moving image sensing is performed will be described below with reference to FIG. 6. Note that the third embodiment performs the camera shake correction operation described with reference to FIGS. 3A to 3C using the digital video camera shown in FIG. 2 described in the first embodiment, and a description thereof will be omitted. However, assume that the image memory 110 comprises a capacity large enough to store image signals for at least two frame images, and such memory will be referred to as first and second frame memories 110a and 110b for the sake of convenience.

(3) Slow Shutter Mode 2

In slow shutter mode 2 shown in FIG. 6, the image sensor 102 is exposed during the same accumulation time period T1 as in the normal mode. During this accumulation time period T1, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image, thus attaining camera shake correction. An image signal for one frame (e.g., "1" in FIG. 6), which is extracted in this way, is stored in the first frame memory 110a.

Next, the image sensor 102 is similarly exposed during the accumulation time period T1 to acquire a camera shake-corrected image signal for one frame (e.g., "2" in FIG. 6). The image processor 112 reads out the image signal (e.g., "1" in FIG. 6) stored in the first frame memory 110a, adds the newly acquired image signal to the readout image signal, and stores the sum image signal (e.g., "1+2" in FIG. 6) in the second frame memory 110b. Parallel to this addition processing, the image processor 112 stores the newly acquired image signal (e.g., "2" in FIG. 6) in the first frame memory 110a.

In this way, a newly acquired image signal is added to the image signal one frame before stored in the first frame memory 110a, and the sum signal is stored in the second frame memory 110b. At the same time, the newly acquired image signal is stored in the first frame memory 110a. As a result, the second frame memory 110b stores an image signal obtained by adding the newly acquired image signal and that acquired one frame before.

The image signal stored in the second frame memory 110b is read out at a vertical synchronization timing and is converted into a standard video signal via the camera signal processor 111, image processor 112, and video output unit 113. After that the video signal is output to and displayed on an image output device such as a display or the like (not shown).

In the third embodiment, since a new sum image signal is stored in the second frame memory 110b for each accumulation time period T1, an image is updated at every vertical synchronization period Tv. Since the image signals for two frames, which are read out at intervals of the accumulation time period T1, are added to generate a sensed image signal, a brighter image can be acquired upon sensing a dark object. But the noise amount increases compared to slow shutter mode 1. However, since camera shake correction is done for respective frames, its characteristics are equivalent to those in the normal mode. Hence, even when the shake amount of the image sensing apparatus is large, an image with a high camera shake correction effect can be acquired.

Modification of Third Embodiment

The third embodiment has explained a case wherein two frame images are stored in the image memory 110. By using the image memory 110 which has a capacity capable of storing three or more images, three or more frame images can be added. Even when a darker image is to be sensed, a brighter image can be acquired while maintaining camera shake correction characteristics equivalent to the normal mode.

(3) Slow Shutter Mode 2

FIG. 7 shows another operation of slow shutter mode 2 upon making progressive moving image sensing, and shows the flows and timings of image signals when image signals for an accumulation time period four times an accumulation time period in the normal mode are to be added. In this case, assume that the image memory 110 has a capacity large enough to store image signals for at least four frame images, and such memory will be referred to as first, second, third, and fourth frame memories 110a, 110b, 110c, and 110d for the sake of convenience.

In slow shutter mode 2 shown in FIG. 7, the image sensor 102 is exposed during the same accumulation time period T1 as in the normal mode. During this accumulation time period T1, the CPU 120 acquires camera shake information from the output of the angular velocity sensor 105, and calculates the average value of the camera shake information. Based on the calculated value, the CPU 120 controls the read timings from the image sensor 102 and line memory 104, as described above with reference to FIGS. 3A to 3C, to extract and read out an image, thus attaining camera shake correction. An image signal for one frame (e.g., "1" in FIG. 7), which is extracted in this way, is stored in the first frame memory 110a.

Next, the image sensor 102 is similarly exposed during the accumulation time period T1 to acquire a camera shake-corrected image signal for one frame (e.g., "2" in FIG. 7). The image processor 112 reads out the image signal (e.g., "1" in FIG. 7) stored in the first frame memory 110a, adds the newly acquired image signal to the readout signal, and stores the sum image signal (e.g., "1+2" in FIG. 7) in the second frame memory 110b. Parallel to this addition processing, the image processor 112 stores the newly acquired image signal (e.g., "2" in FIG. 7) in the first frame memory 110a.

Furthermore, the image sensor 102 is similarly exposed during the accumulation time period T1 to acquire a camera shake-corrected image signal for one frame (e.g., "3" in FIG. 7). The image processor 112 reads out the image signal (e.g., "2" in FIG. 7) stored in the first frame memory 110a, adds the newly acquired image signal to the readout signal, and stores the sum image signal (e.g., "2+3" in FIG. 7) in the second frame memory 110b. Also, the image processor 112 reads out the image signal (e.g., "1+2" in FIG. 7) stored in the second frame memory 110b, adds the newly acquired image signal (e.g., "3" in FIG. 7) to the readout signal, and stores the sum signal (e.g., "1+2+3" in FIG. 7) in the third frame memory 110c. Parallel to these addition processings, the image processor 112 stores the newly acquired image signal (e.g., "3" in FIG. 7) in the first frame memory 110a.

Moreover, the image sensor 102 is similarly exposed during the accumulation time period T1 to acquire a camera shake-corrected image signal for one frame (e.g., "4" in FIG. 7). Likewise, the newly acquired image signal is added to the image signals stored in the first to third frame memories 110a to 110c, and the sum image signals (e.g., "3+4", "2+3+4", and "1+2+3+4" in the example of FIG. 7) are stored in the second to fourth frame memories 110b to 110d. In addition, the newly acquired image signal (e.g., "4" in FIG. 7) is stored in the first frame memory 110a.

With the above control, the fourth frame memory 110a stores an image signal obtained by adding the newly acquired image signal and all the image signals acquired up to three frames before. The processes from the read process until the display process of the image signal from the fourth frame memory 110d are the same as those in the third embodiment, and a description thereof will be omitted.

In this way, in slow shutter mode 2 of this modification, since the image signals for four frames, which are read out at intervals of the accumulation time period T1, are added to generate a sensed image signal, a brighter image can be acquired upon sensing a dark object. But the noise amount increases compared to slow shutter mode 1. However, since camera shake correction is done for respective frames, its characteristics are equivalent to those in the normal mode. Hence, even when the shake amount of the image sensing apparatus is large, an image with a high camera shake correction effect can be acquired.

Note that the number of frames to be added is not limited to four, and image signals for an arbitrary number of frames can be controlled to be added in correspondence with the capacity of the image memory 110.

The third embodiment and its modification have explained a case of progressive moving image sensing. However, the present invention can also be applied to interlaced moving image sensing described in the second embodiment.

Fourth Embodiment

The fourth embodiment of the present invention will be described below.

Figure 8:
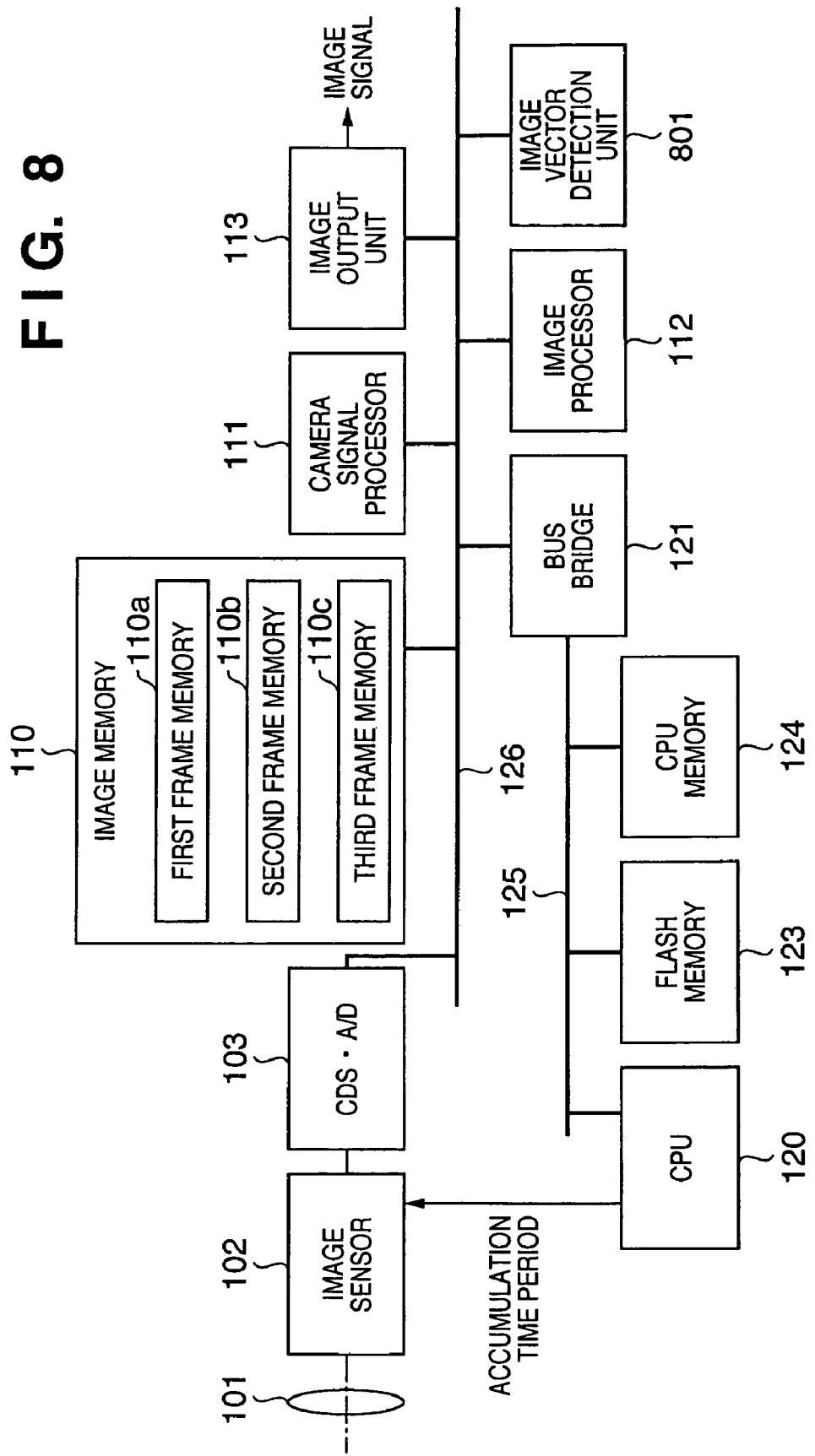
FIG. 8 is a block diagram showing the arrangement of an image sensing apparatus according to the fourth and fifth embodiments of the present invention.

FIG. 8 is a block diagram showing the arrangement of a digital video camera (to be simply referred to as a "camera" hereinafter) as the image sensing apparatus according to the fourth embodiment of the present invention. Note that the same reference numerals in FIG. 8 denote the same components as in the arrangement of FIG. 2 described in the first embodiment, and a description thereof will be omitted. The arrangement of the camera shown in FIG. 8 is different from that shown in FIG. 2 in that the angular velocity sensor 105 and line memory 104 are omitted, and an image vector detection unit 801 is added and is connected to the image bus 126. In the fourth embodiment, the image memory 110 has a capacity capable of storing image signals for at least three frame images, and such memory will be referred to as first, second, and third frame memories 110a, 110b, and 110c for the sake of convenience. Note that the first and second frame memories 110a and 110b must have a capacity for storing a full signal read out from the image sensor 102. However, the third frame memory 110c suffices to have a capacity capable of storing an image signal which is extracted and read out for camera shake correction of the signal read out from the image sensor 102.

Light coming from an object forms an image on the image sensor 102 via the lens group 101. An object image formed on the image sensor 102 is sampled/held and is then converted from an analog signal into a digital signal by the CDS·A/D circuit 103. The digital image signal obtained in this way is output onto the image bus 126, and is alternately temporarily stored in either the first or second frame memory 110a or 110b every time a frame image is read out.

The image vector detection unit 801 detects a motion vector of images by comparing two images which are temporarily stored in the first and second frame memories 110a and 110b and are obtained successively, and detects camera shake information of an image hazardous to image sensing from the detected motion vector.

In the fourth embodiment as well, camera shake correction is implemented by a method based on the concept similar to that of the image extraction method described with reference to FIG. 3A. However, the camera shake correction is made based on camera shake information in the horizontal direction and that in the vertical direction obtained from the image vector detection unit 801 in place of the camera shake information from the output of the angular velocity sensor 105, and only image signal components between vertical positions V1 and V2 and horizontal positions H1 and H2 of those of all pixels of the image sensor 102 stored in the image memory 110 are read out, thus correcting a camera shake.

The flows and timings of signals in the normal mode, slow shutter mode 1, and slow shutter mode 2 described using FIG. 1 when camera shake detection is made using the image vector detection unit 801 and progressive moving image sensing is performed will be described below with reference to FIGS. 9A to 9C.

(1) Normal Mode

The operation in the normal mode shown in FIG. 9A will be explained first. Operations for making the image sensor 102 photoelectrically convert light coming from an object and accumulate charges during an accumulation time period T1 and, after completion of the accumulation time period T1, alternately reading out charge signals from the image sensor 102 and alternately storing them in the first and second frame memories 110a and 110b via the CDS·A/D circuit 103 are repeated. The image vector detection unit 801 detects a motion vector by comparing the newly readout image (e.g., "2" stored in the second frame memory 110b) with the image (e.g., "1" stored in the first frame memory 110a) read out one frame before, and detects camera shake information of the newly readout image ("2" in the above example) based on the detected motion vector. Note that numerals in parentheses beside pulses in camera shake detection in FIGS. 9A to 9C indicate images whose camera shake information is to be detected.

Next, the horizontal and vertical read positions of the first or second frame memory 110a or 110b are controlled at a vertical synchronization timing on the basis of the detected camera shake information so as to extract and read out the newly readout image (e.g., "2" stored in the frame memory 110b), thus attaining camera shake correction. The corrected image signal is then supplied to the camera signal processor 111.

The image signal is converted into a standard video signal via the camera signal processor 111, image processor 112, and video output unit 113, and is output to and displayed on an image output device such as a display or the like (not shown). Note that a vertical synchronization period Tv at that time is equal to the accumulation time period T1 of the image sensor 102. By repeating processes from the read process until the display output process, a moving image is sensed.

(2) Slow Shutter Mode 1

The operation in slow shutter mode 1 shown in FIG. 9B will be described below.

In slow shutter mode 1, operations for exposing the image sensor 102 during an accumulation time period T2 twice an accumulation time period in the normal mode to accumulate charges and, after completion of the accumulation time period T2, reading out charge signals from the image sensor 102 and storing them alternately in the first and second frame memories 110a and 110b via the CDS·A/D circuit 103 are repeated. The image vector detection unit 801 detects a motion vector by comparing the newly readout image (e.g., "2" stored in the second frame memory 110b) with the image (e.g., "1" stored in the first frame memory 110a) read out one frame before, and detects camera shake information of the newly readout image (image "2" in the above example) based on the detected motion vector.

Next, the horizontal and vertical read positions of the first or second frame memory 110a or 110b are controlled at a vertical synchronization timing on the basis of the detected camera shake information so as to extract and read out the newly readout image (e.g., "2" stored in the frame memory 110b), thus attaining camera shake correction. The corrected image signal is then supplied to the camera signal processor 111.

The image signal is converted into a standard video signal via the camera signal processor 111, image processor 112, and video output unit 113, and is output to and displayed on an image output device such as a display or the like (not shown). However, in this case, as can be seen from FIG. 9B, since the accumulation time period of the image sensor 102 in slow shutter mode 1 is twice an accumulation time period in the normal mode, an image is stored in the frame memory 110a or 110b at every other time interval corresponding to the accumulation time period T1. Since the vertical synchronization period Tv is ½ the accumulation time period T2, an identical image is repetitively output twice, and an image update cycle appears once per two vertical synchronization periods Tv. Furthermore, since a camera shake correction cycle also appears once per two vertical synchronization periods Tv, the camera shake correction characteristics are inferior to those in the normal mode. However, upon sensing a dark image, since the accumulation time period is set to be twice an accumulation time period in the normal mode, the charge amount accumulated on the image sensor 102 can be increased, thus acquiring a brighter image which suffers less noise.

(3) Slow Shutter Mode 2

Finally, the operation in slow shutter mode 2 shown in FIG. 9C will be described below.

In slow shutter mode 2, operations for exposing the image sensor 102 during the same accumulation time period T1 as in the normal mode to accumulate charges and, after completion of the accumulation time period T1, reading out charge signals from the image sensor 102 and storing them alternately in the first and second frame memories 110a and 110b via the CDS·A/D circuit 103 are repeated. The image vector detection unit 801 detects a motion vector by comparing the newly readout image (e.g., "2" stored in the second frame memory 110b) with the image (e.g., "1" stored in the first frame memory 110a) read out one frame before, and detects camera shake information of the newly readout image ("2" in the above example) based on the detected motion vector.

Next, the horizontal and vertical read positions of the first or second frame memory 110a or 110b are controlled at a vertical synchronization timing on the basis of the detected camera shake information so as to extract and read out the newly readout image (e.g., "2" stored in the frame memory 110b), thus attaining camera shake correction.

The extracted image (e.g., "1'" stored in the first frame memory 110a) is stored in the third frame memory 110c. The image processor 112 adds the currently extracted image signal (e.g., "2'") to the image signal (e.g., "1'") extracted one frame before, and stores the sum image signal (e.g., "1'+2'") in the third frame memory 110c again.

The image signal stored in the third frame memory 110c is converted into a standard video signal at a vertical synchronization timing via the camera signal processor 111, image processor 112, and video output unit 113, and is output to and displayed on an image output device such as a display or the like (not shown). In this case, the vertical synchronization period Tv is equal to the accumulation time period T1 of each frame. However, since the sum image signal is stored in the third frame memory 110c once per two accumulation time periods T1, an identical image is repetitively output twice, and the image update cycle appears once per two vertical synchronization periods. However, upon sensing the dark image, a brighter image can be obtained.

In this manner, in slow shutter mode 2, image signals for two frames, each of which is read out during the accumulation time period T1, are added to generate a sensed image signal in place of single long-time accumulation on the image sensor 102 unlike in slow shutter mode 1. Although the noise amount increases compared to slow shutter mode 1, since camera shake correction is made for each frame, its characteristics become equivalent to those in the normal mode. Even when a camera shake is large, an image with a high camera shake correction effect can be acquired.

Fifth Embodiment

The fifth embodiment of the present invention will be described below.

Figure 10A:
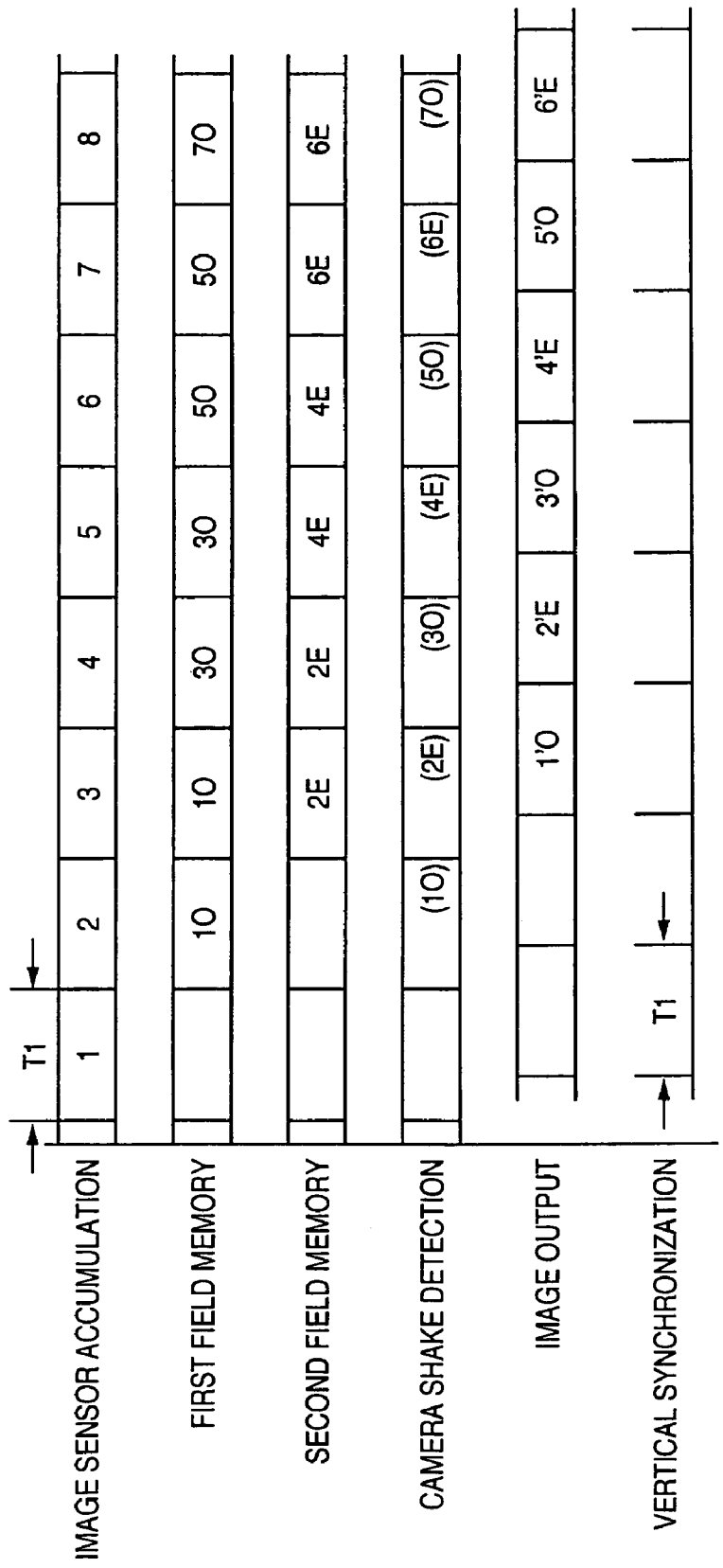

In the fifth embodiment, the flows and timings of signals in the normal mode, slow shutter mode 1, and slow shutter mode 2 described using FIG. 1 when camera shake detection is made using the image vector detection unit 801 and interlaced moving image sensing is performed will be described below with reference to FIGS. 10A to 10C. Note that the fifth embodiment performs the camera shake correction operation described with reference to FIG. 3A using the digital video camera shown in FIG. 8 described in the fourth embodiment, and a description thereof will be omitted. However, since the fifth embodiment adopts interlaced read processing, the image memory 110 need only store image signals for at least three field images. Assume that such memory will be referred to as first to third field memories 210a to 210c (not shown) for the sake of convenience, and they are used in place of the first to third frame memories 110a to 110c.

(1) Normal Mode

The operation in the normal mode shown in FIG. 10A will be explained first. Operations for making the image sensor 102 photoelectrically convert light coming from an object and accumulate charges during an accumulation time period T1 and, after completion of the accumulation time period T1, reading out the accumulated charge signals every other line so as to read out charge signals each for one field from the image sensor 102 alternately onto the first and second field memories 210a and 210b via the CDS·A/D circuit 103 are repeated. After that, by reading out signal components of lines different from those from which image signal components accumulated in the immediately preceding accumulation time period T1 are read out, image signals for one field (e.g., "1O", "2E", "3O", "4E", etc. in FIG. 10A) are stored alternately in the first and second field memories 210a and 210b. Note that "O" indicates an odd field, and "E" indicates an even field.

The image vector detection unit 801 detects a motion vector by comparing the newly readout field image (e.g., "2E" stored in the second field memory 210b) with the image (e.g., "1O" stored in the first field memory 210a) read out one field before, and detects camera shake information of the newly readout field image (e.g., "2E" stored in the second field memory 210b) based on the detected motion vector. Next, the horizontal and vertical read positions of the first or second field memory 210a or 210b are controlled at a vertical synchronization timing on the basis of the detected camera shake information so as to extract and read out the newly readout image (e.g., "2E" stored in the second field memory 210b), thus attaining camera shake correction. The corrected image signal is then supplied to the camera signal processor 111.

The image signal is converted into a standard video signal via the camera signal processor 111, image processor 112, and video output unit 113, and the image signals of odd and even fields are alternately output to and displayed on an image output device such as a display or the like (not shown). Note that a vertical synchronization period Tv at that time is equal to the accumulation time period T1 of the image sensor 102.

(2) Slow Shutter Mode 1

The operation in slow shutter mode 1 shown in FIG. 10B will be described below.

In slow shutter mode 1, operations for exposing the image sensor 102 during an accumulation time period T2 twice an accumulation time period in the normal mode to accumulate charges and, after completion of the accumulation time period T2, reading out the accumulated charge signals every other line so as to read out charge signals each for one field (e.g., "1O", "2O", "3O" in FIG. 10B) from the image sensor 102 alternately onto the first and second field memories 210a and 210b via the CDS·A/D circuit 103 are repeated. Note that the example of FIG. 10B shows a case wherein only odd fields are read out. However, only even fields may be read out.

The image vector detection unit 801 detects a motion vector by comparing the newly readout field image (e.g., "2O" stored in the second field memory 210b) with the image (e.g., "1O" stored in the first field memory 210a) read out one field before, and detects camera shake information of the newly readout field image (e.g., "2O" stored in the second field memory 210b) based on the detected motion vector. Next, the horizontal and vertical read positions of the first or second field memory 210a or 210b are controlled at a vertical synchronization timing on the basis of the detected camera shake information so as to extract and read out the newly readout image (e.g., "2O" stored in the second field memory 210b), thus attaining camera shake correction. The corrected image signal is then supplied to the camera signal processor 111.

The image signal is converted into a standard video signal of one field via the camera signal processor 111, image processor 112, and video output unit 113, an image signal of the other field (even field in the example of FIG. 10B) is generated from the image signal of the one field (odd field in the example of FIG. 10B), and these image signals are output to and displayed at vertical synchronization timings on an image output device such as a display or the like (not shown). Note that a vertical synchronization period Tv at that time is ½ the accumulation time period T2. However, since the other field (even field in the example of FIG. 10B) is generated from the one field (odd field in the example of FIG. 10B), an image update cycle becomes equal to the vertical synchronization period Tv.

Since a camera shake correction cycle appears once per two vertical periods, the camera shake correction characteristics are inferior to those in the normal mode. However, upon sensing a dark image, since the accumulation time period is set to be twice that in the normal mode, the charge amount accumulated on the image sensor 102 can be increased, thus acquiring a brighter image which suffers less noise.

(3) Slow Shutter Mode 2

Finally, the operation in slow shutter mode 2 shown in FIG. 10C will be described below.

In slow shutter mode 2, operations for exposing the image sensor 102 during the same accumulation time period T1 as in the normal mode to accumulate charges and, after completion of the accumulation time period T1, reading out the accumulated charge signals every other line so as to read out charge signals each for one field (e.g., "1O", "2O", "3O" in FIG. 10C) from the image sensor 102 alternately onto the first and second field memories 210a and 210b via the CDS·A/D circuit 103 are repeated. Note that the example of FIG. 10C shows a case wherein only odd fields are read out. However, only even fields may be read out.

After that, the image vector detection unit 801 detects a motion vector by comparing the newly readout field image (e.g., "2O" stored in the second field memory 210b) with the image (e.g., "1O" stored in the first field memory 210a) read out one field before, and detects camera shake information of the newly readout field image (e.g., "2O" stored in the second field memory 210b) based on the detected motion vector. Next, the horizontal and vertical read positions of the first or second field memory 210a or 210b are controlled at a vertical synchronization timing on the basis of the detected camera shake information so as to extract and read out the newly readout field image (e.g., "2O" stored in the second field memory 210b), thus attaining camera shake correction.

The extracted image (e.g., "1'O" extracted from "1O" stored in the first field memory 210a) is stored in the third field memory 210c. The image processor 112 adds the currently extracted image signal (e.g., "2'O" extracted from "2O" stored in the second field memory 210b) to the image signal (e.g., "1'O" stored in the third field memory 210c) extracted one field before, and stores the sum image signal (e.g., "1'O+2'O") in the third field memory 210c again.

The image signal for one field stored in the third field memory 210c is converted into a standard video signal of one field at a vertical synchronization timing via the camera signal processor 111, image processor 112, and video output unit 113, an image signal (e.g., "1'O+2'O, E") of the other field (even field in the example of FIG. 10C) is generated from the image signal (e.g., "1'O+2'O, O") of the one field (odd field in the example of FIG. 10C), and they are output to and displayed on an image output device such as a display or the like (not shown). In this case, the vertical synchronization period Tv is equal to the accumulation time period T1 of each field. The sum image signal is stored in the third field memory 210c once per two vertical synchronization periods Tv, since the other field (e.g., an even field) is generated from the one field (e.g., an odd field), an image update cycle becomes equal to the vertical synchronization period Tv.

In this manner, in slow shutter mode 2, image signals for two fields, each of which is read out during the accumulation time period T1, are added to generate a sensed image signal in place of single long-time accumulation on the image sensor 102 unlike in slow shutter mode 1. Hence, upon sensing a dark object, a brighter image can be acquired, but the noise amount increases compared to slow shutter mode 1. However, since camera shake correction is made for each field, its characteristics become equivalent to those in the normal mode. Even when a camera shake is large, an image with a high camera shake correction effect can be acquired.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-377240 and filed on Dec. 27, 2004, which is hereby incorporated herein by reference herein.

What is claimed is:

1. An image sensing apparatus which has a camera shake correction function of performing a camera shake correction on a plurality of images sensed by an image sensing unit by extracting a partial image from each of the sensed images on the basis of correlation between the sensed images, comprising:

a camera shake amount detection unit that detects a camera shake amount of said image sensing apparatus, an exposure control unit that controls to expose said image sensing unit for a first exposure time period when the camera shake amount is equal to or less than a predetermined amount, and for a second exposure time period which is shorter than the first exposure time period when the camera shake amount is greater than the predetermined amount; and an addition unit that, when the camera shake amount is greater than the predetermined amount, adds image signals of a plurality of images which undergo the camera shake correction, and outputs the added image signals as one image.

2. The apparatus according to claim 1, wherein said camera shake amount detection unit comprises an angular velocity sensor.

3. The apparatus according to claim 1, wherein said camera shake amount detection unit detects the camera shake amount by detecting a motion vector between the plurality of sensed images.

4. The apparatus according to claim 1, wherein the first exposure time period is an integer multiple of the second exposure time period, and said addition unit adds image signals of the integer number of images.

5. The apparatus according to claim 1, further comprising a photometry unit,
   wherein, when luminance of an object is brighter than a predetermined luminance as a photometry result of said photometry unit, said exposure control unit controls to expose said image sensing unit for a third exposure time period which is shorter than the first exposure time period regardless of the camera shake amount detected by said camera shake amount detection unit.

6. The apparatus according to claim 1, wherein said image sensing apparatus is a moving image sensing apparatus.

7. The apparatus according to claim 1, wherein the image sensing unit performs progressive scanning.

8. The apparatus according to claim 5, wherein said image sensing unit performs interlace scanning, and, when the luminance of the object is darker than a predetermined luminance as a photometry result of said photometry unit, image signals of one of fields are processed.

9. A method of controlling an image sensing apparatus which has a camera shake correction function of performing a camera shake correction on a plurality of images sensed by an image sensing unit by extracting a partial image from each of the sensed images on the basis of correlation between the sensed images, comprising:
   detecting a camera shake amount of said image sensing apparatus;
   controlling to expose said image sensing unit for a first exposure time period when the camera shake amount is equal to or less than a predetermined amount, and for a second exposure time period which is shorter than the first exposure time period when the camera shake amount is greater than the predetermined amount; and
   when the camera shake amount is greater than the predetermined amount, adding image signals of a plurality of images which undergo the camera shake correction, and outputs the added image signals as one image.

10. The method according to claim 9, wherein said camera shake amount is detected using an angular velocity sensor.

11. The method according to claim 9, wherein said camera shake amount is detected by detecting a motion vector between the plurality of sensed images.

12. The method according to claim 9, wherein the first exposure time period is an integer multiple of the second exposure time period, and image signals of the integer number of images are added.

13. The method according to claim 9, further comprising performing photometry,
   wherein, when luminance of an object is brighter than a predetermined luminance as a result of said photometry, said image sensing unit is exposed for a third exposure time period which is shorter than the first exposure time period regardless of the detected camera shake amount.

14. The method according to claim 9, wherein said image sensing apparatus is a moving image sensing apparatus.

15. The method according to claim 9, wherein the image sensing unit performs progressive scanning.

16. The apparatus according to claim 13, wherein said image sensing unit performs interlace scanning, and, when the luminance of the object is darker than a predetermined luminance as a result of said photometry, image signals of one of fields are processed.

17. A storage medium readable by an information processing apparatus, storing a program which has a program code for implementing a control method of claim 9, and can be executed by the information processing apparatus.

* * * * *